United States Patent
Weems et al.

[11] Patent Number: 5,839,192
[45] Date of Patent: Nov. 24, 1998

[54] METHOD AND APPARATUS FOR REPAIRING CRACKED CORE SPRAY SUPPLY PIPING IN A BOILING WATER REACTOR

[75] Inventors: Sterling J. Weems, Chevy Chase; William E. Sylvester, New Carrollton, both of Md.

[73] Assignee: MPR Associates, Inc., Alexandria, Va.

[21] Appl. No.: 758,056

[22] Filed: Nov. 27, 1996

[51] Int. Cl.[6] ........................................................ B23P 15/00
[52] U.S. Cl. .................................. 29/890.031; 29/402.14; 29/723
[58] Field of Search ............................ 29/890.31, 402.14, 29/402.15, 402.09, 402.01, 723; 138/99; 137/15, 315

[56] References Cited

U.S. PATENT DOCUMENTS

| | | |
|---|---|---|
| 4,572,548 | 2/1986 | Porowski et al. . |
| 4,575,129 | 3/1986 | Porowski . |
| 4,585,091 | 4/1986 | Budd . |

OTHER PUBLICATIONS

J.S. Abel, M.C. Strait, "Applicability of Pipelocks as a Remedy for Intergranular Stress Corrosion Cracking in BWRs", *Int. J. Pres. Ves. & Piping* 25, 1986, pp. 25–46.

J. S. Abel, "Mechanical Methods of Improving Resistance to Stress Corrosion Cracking in BWR Piping Systems", *Int. J. Pres. Ves. & Piping* 34, 1988, pp. 17–29.

*Primary Examiner*—Irene Cuda

[57] ABSTRACT

An apparatus for repairing cracked core spray supply piping in a boiling water reactor vessel includes a pair of clamps extending circumferentially around the piping on opposite sides of a crack and a preloading mechanism urging the clamps toward one another to apply and maintain an axially compressive load on the piping tending to close the crack. For vertical sections of core spray supply piping, the clamps are secured at vertically spaced locations with each of the clamps including a first jaw extending circumferentially around a first portion of the piping and including a first opening oriented substantially parallel to a longitudinal axis of the piping and an elongate passage or channel oriented substantially perpendicular to and in communication with the first opening. A second jaw extends circumferentially around a second portion of the pipe in horizontally opposed relation to the first jaw and includes an elongate extension slidably received in the elongate channel and defining a second opening partially aligned with the first opening, with a wedge being movably disposed in the aligned openings to cause the second jaw to move relative to the first jaw in a direction substantially perpendicular to the longitudinal axis of the piping in response to straight, vertical operations. For horizontal sections of core spray supply piping, the clamps are secured at horizontally spaced locations with each of the clamps having a pair of jaws extending circumferentially around the piping in opposed relation and a horizontal preloading mechanism extending between the jaws in tension, the horizontal preloading mechanism being similar to the clamping mechanism used for vertical sections to facilitate installation using straight, vertical operations.

14 Claims, 17 Drawing Sheets

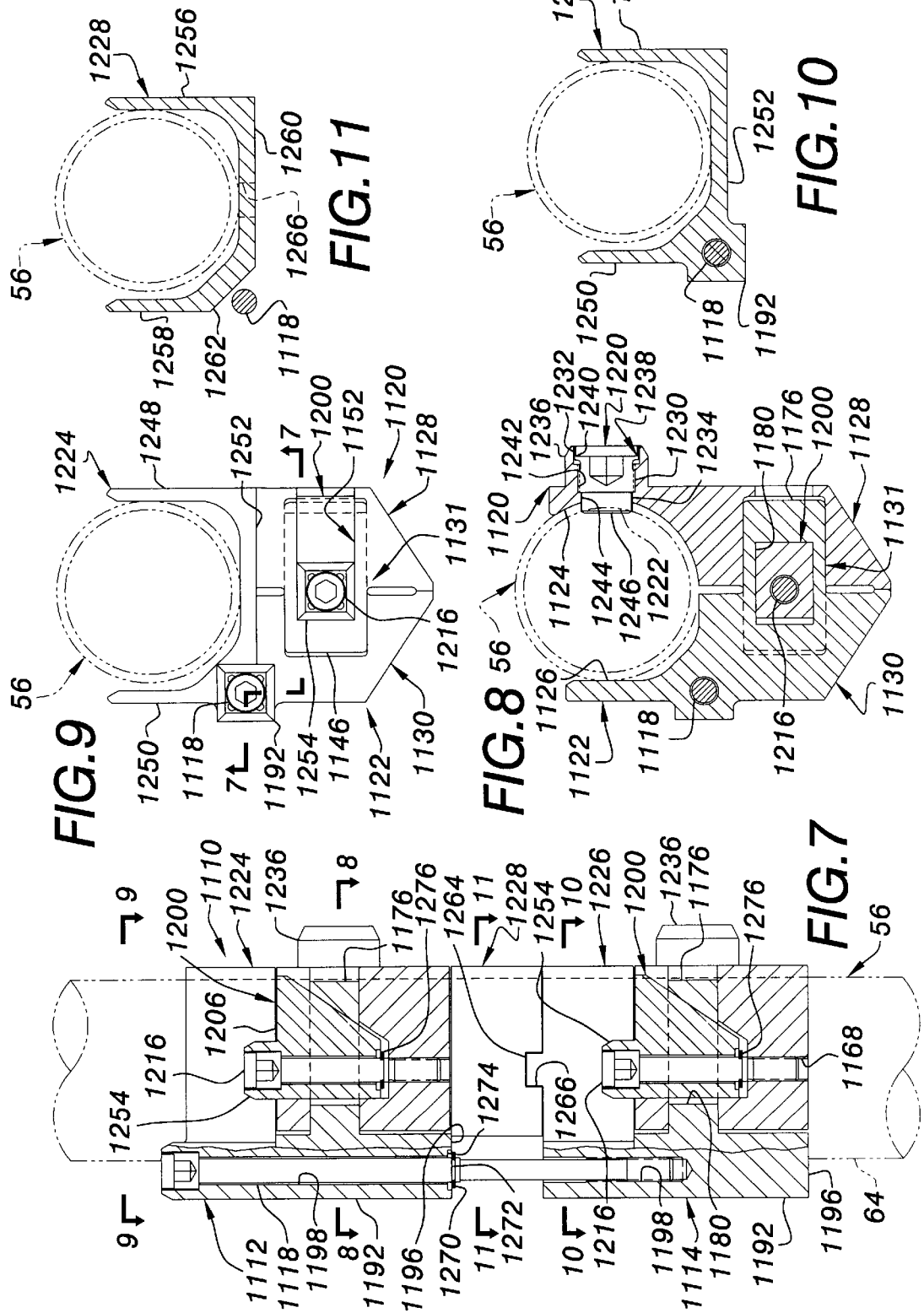

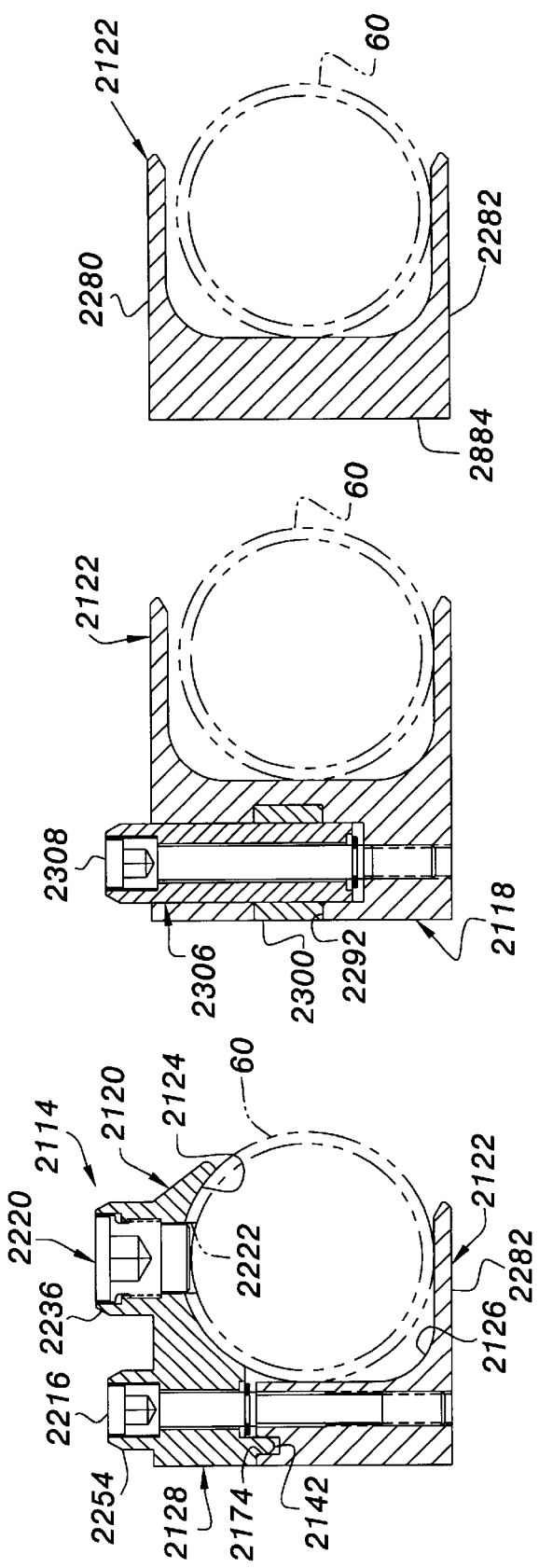

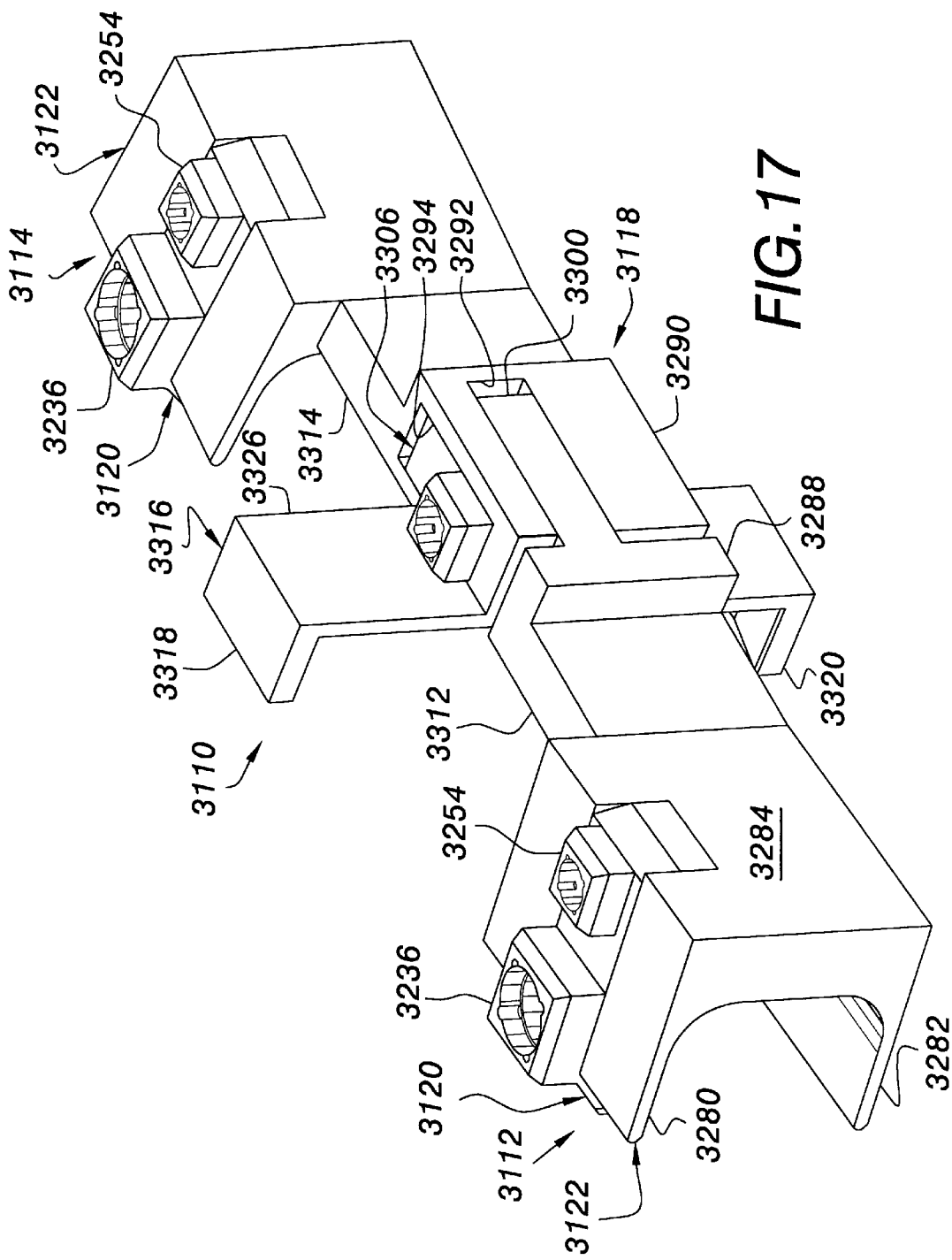

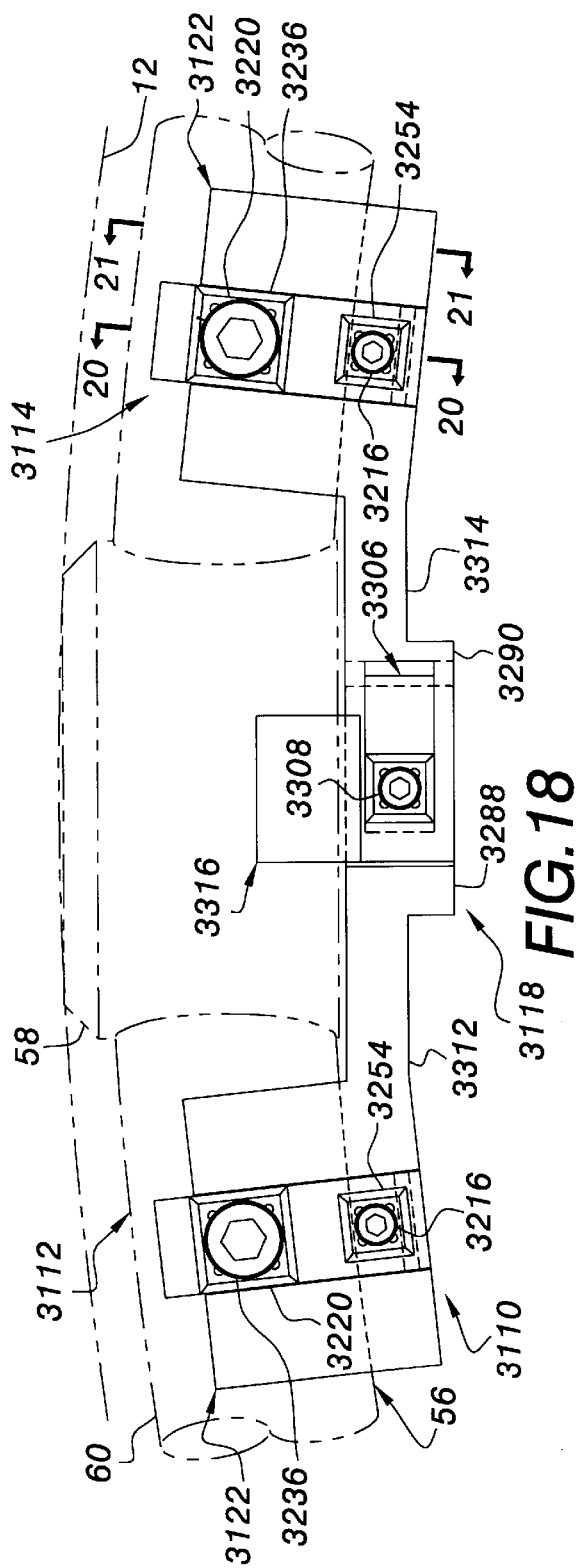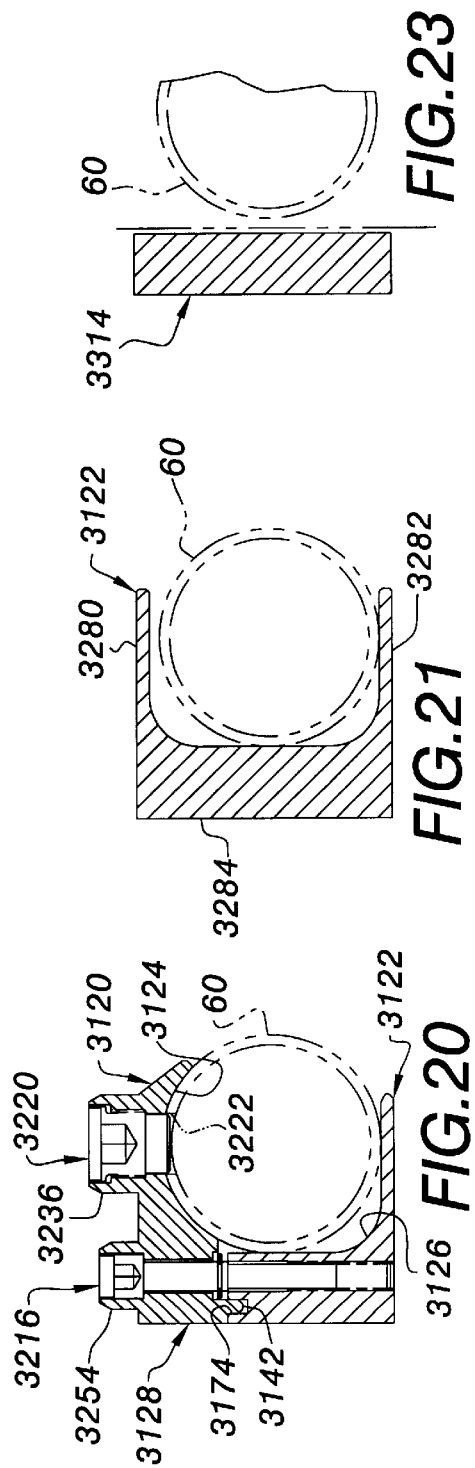

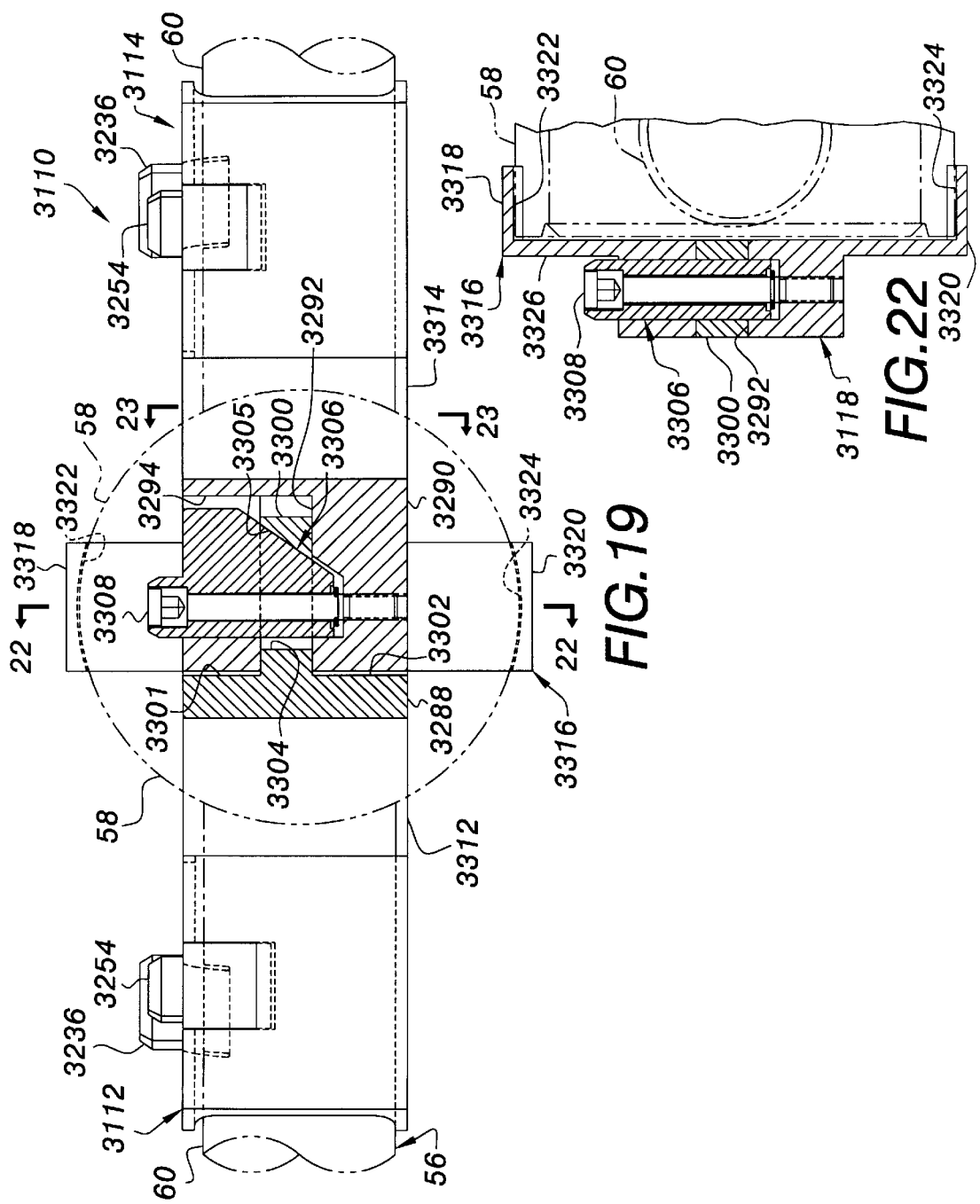

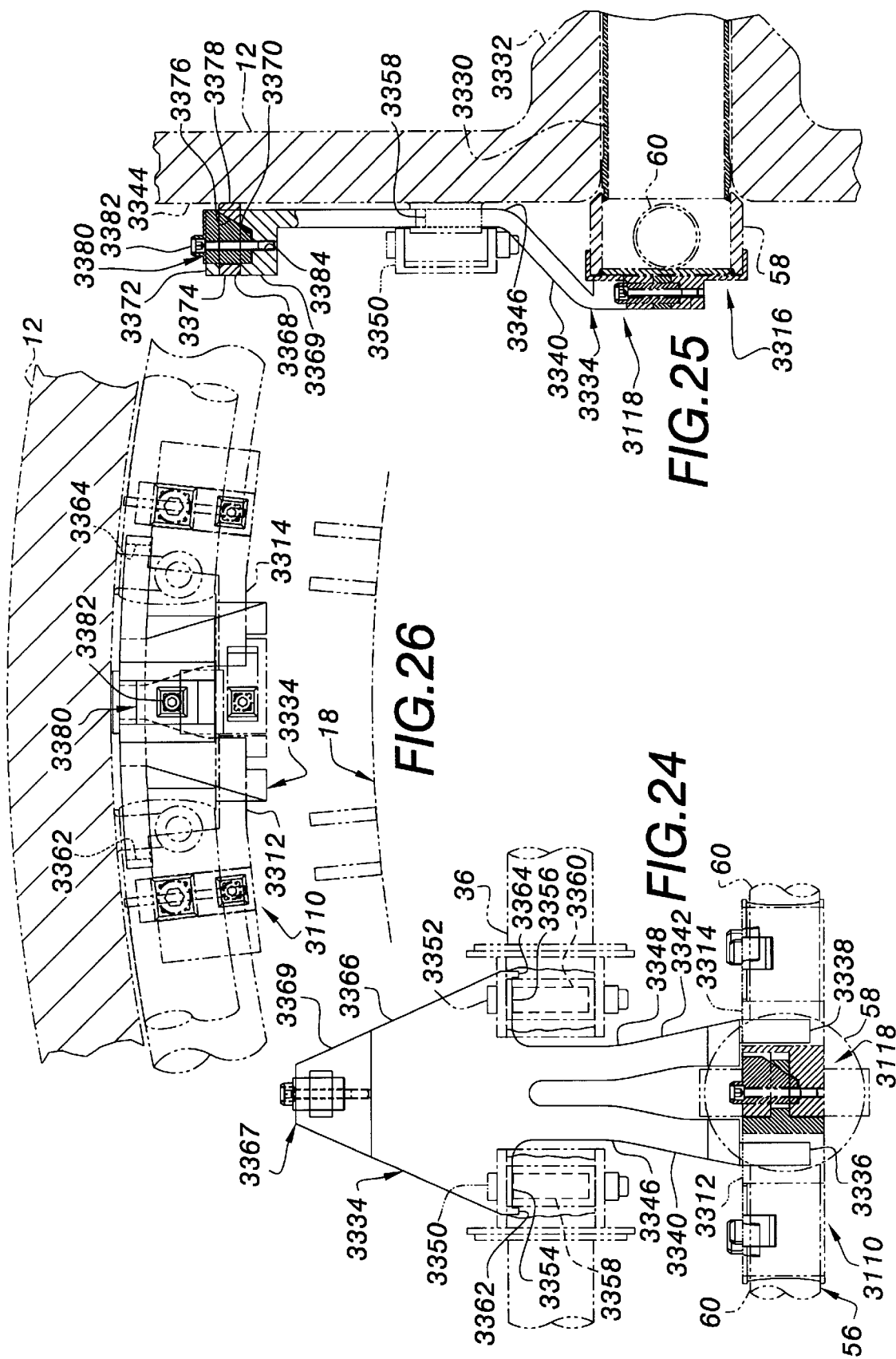

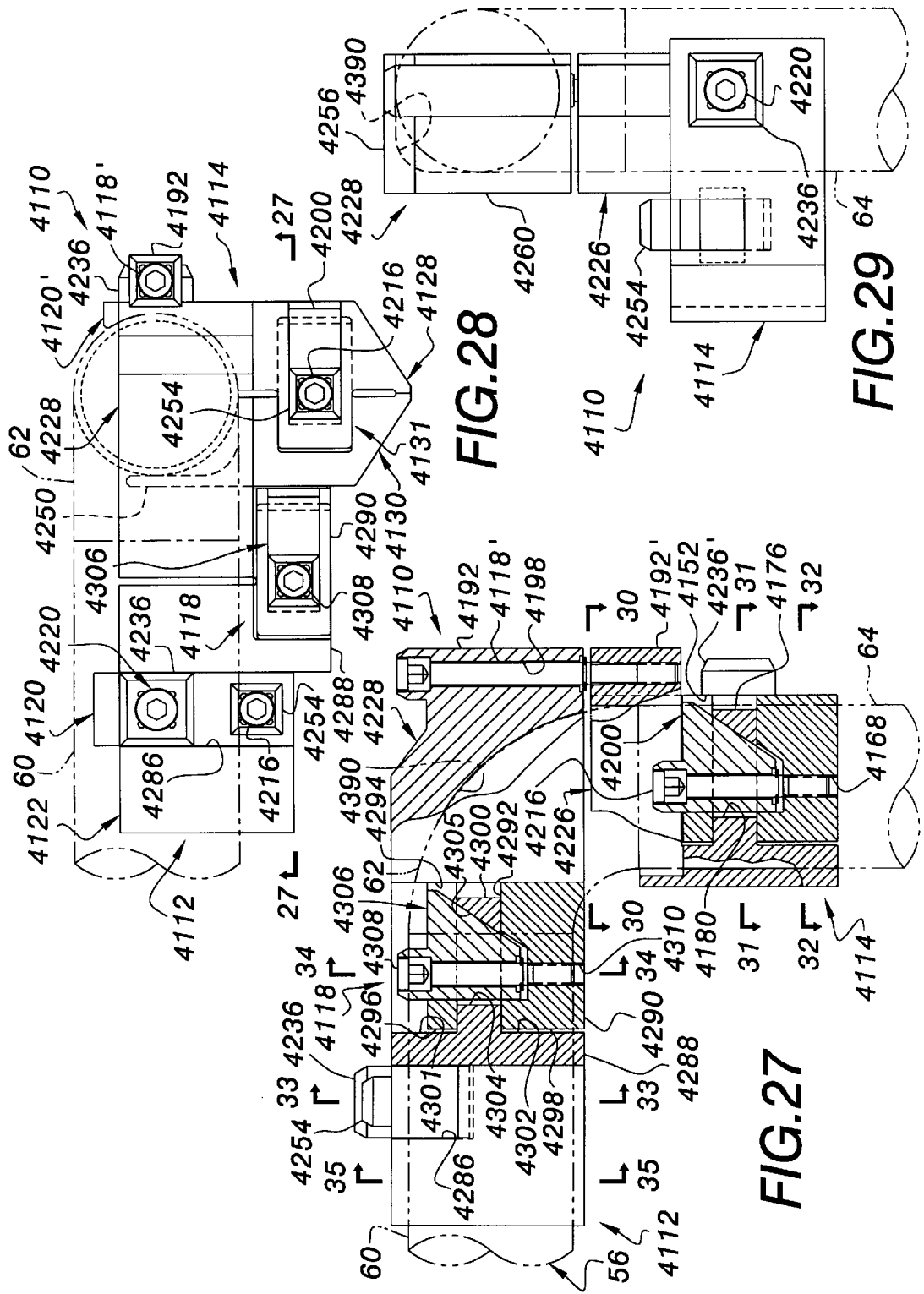

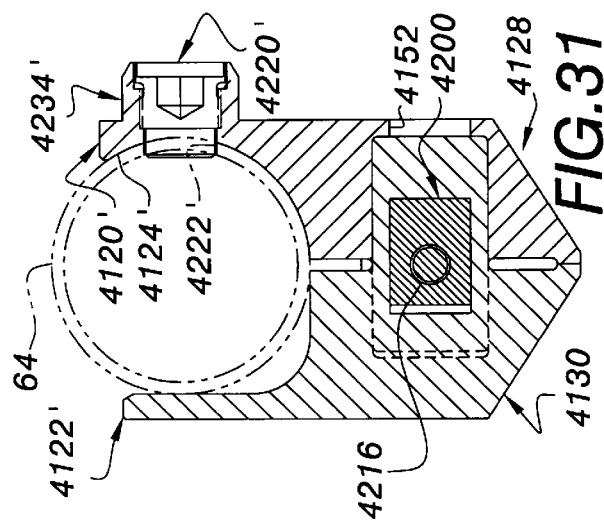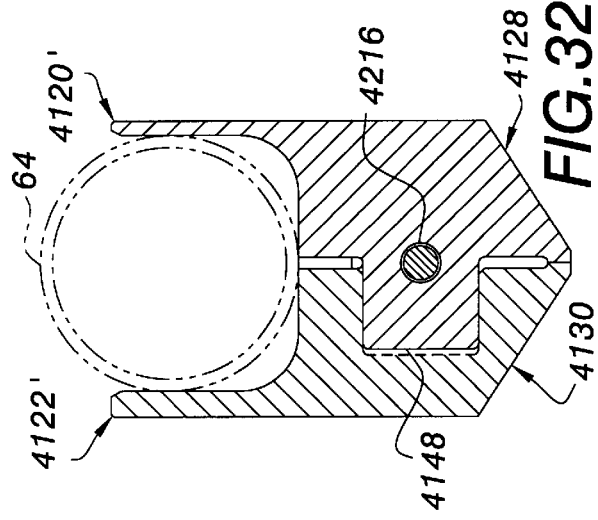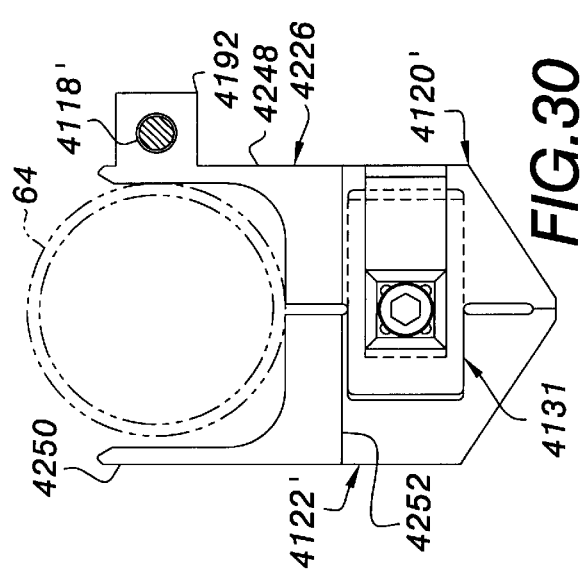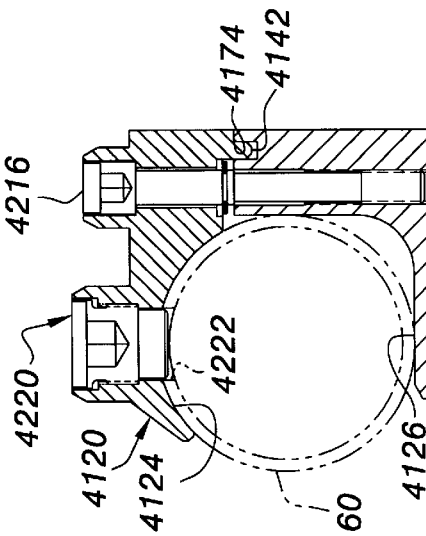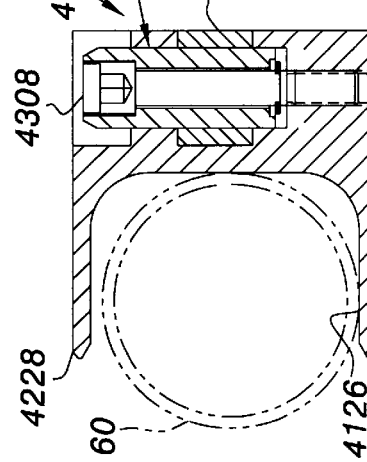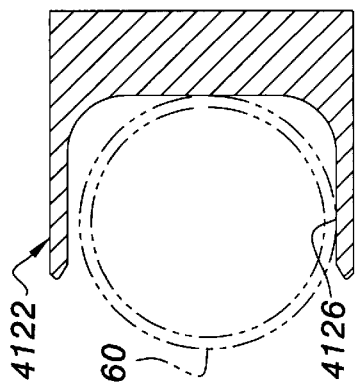

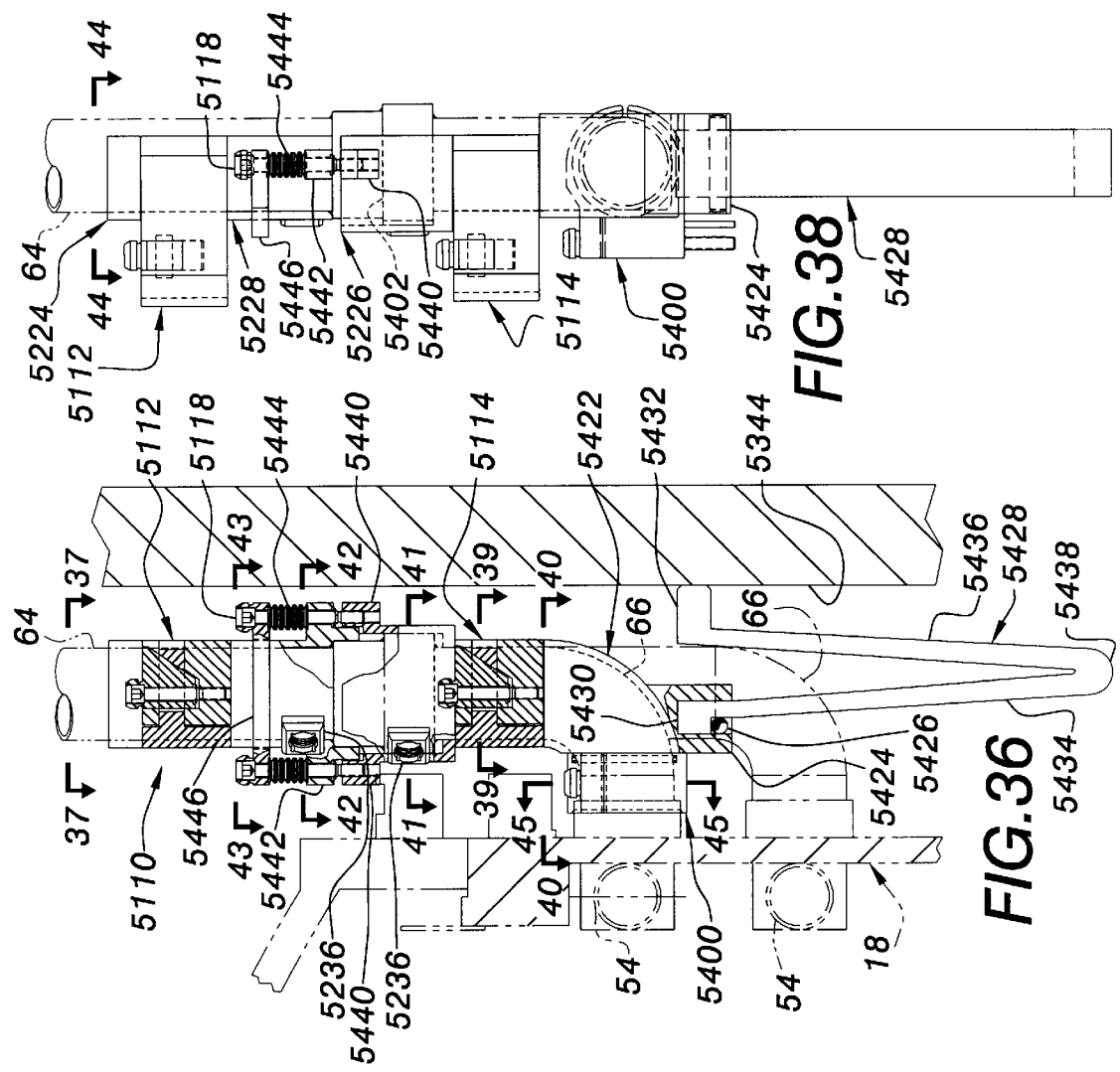
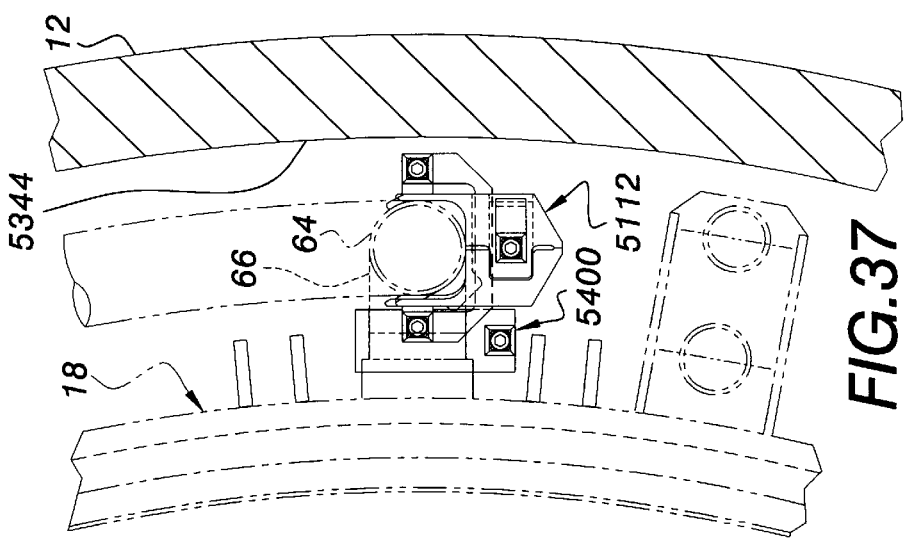

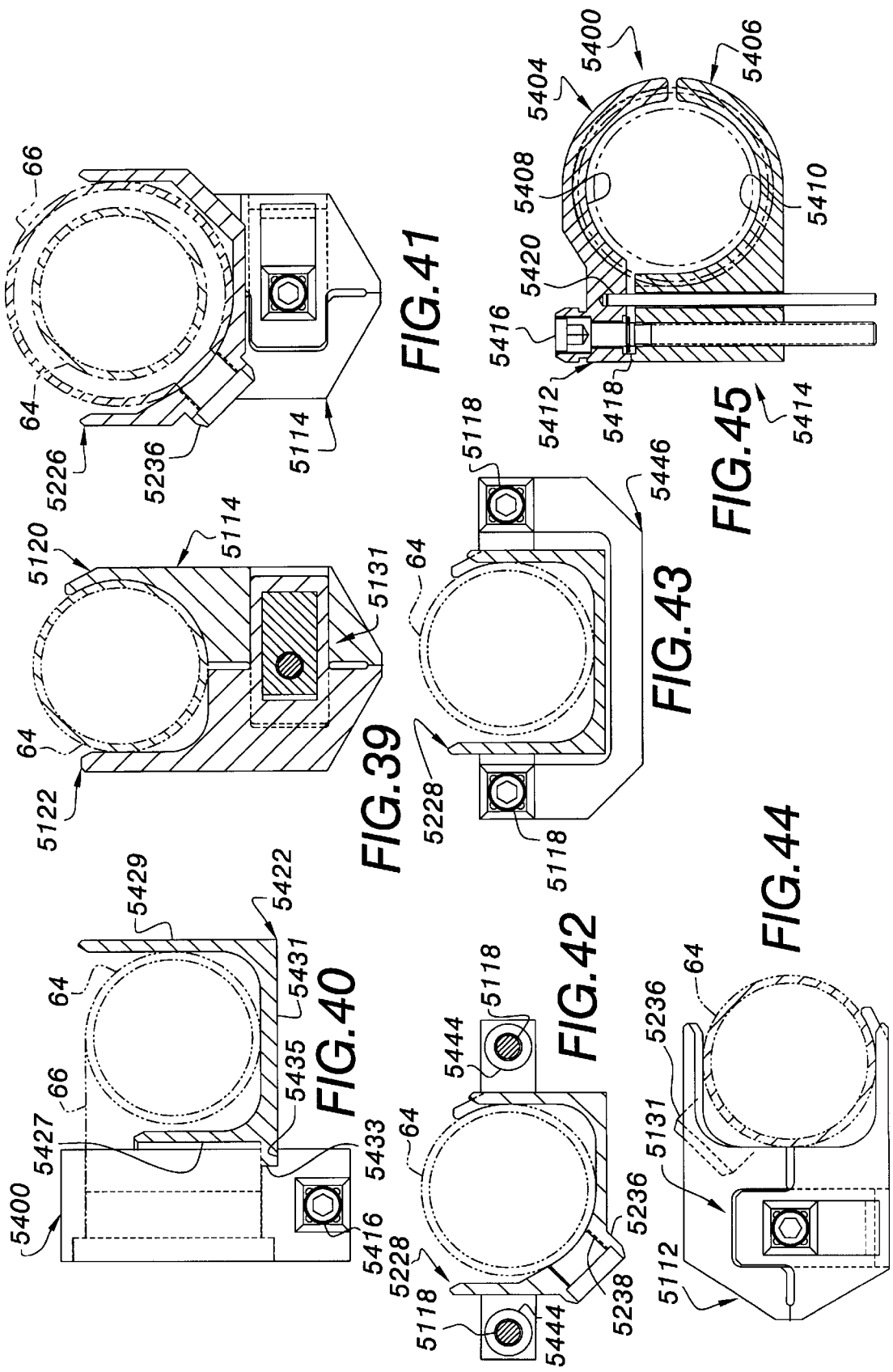

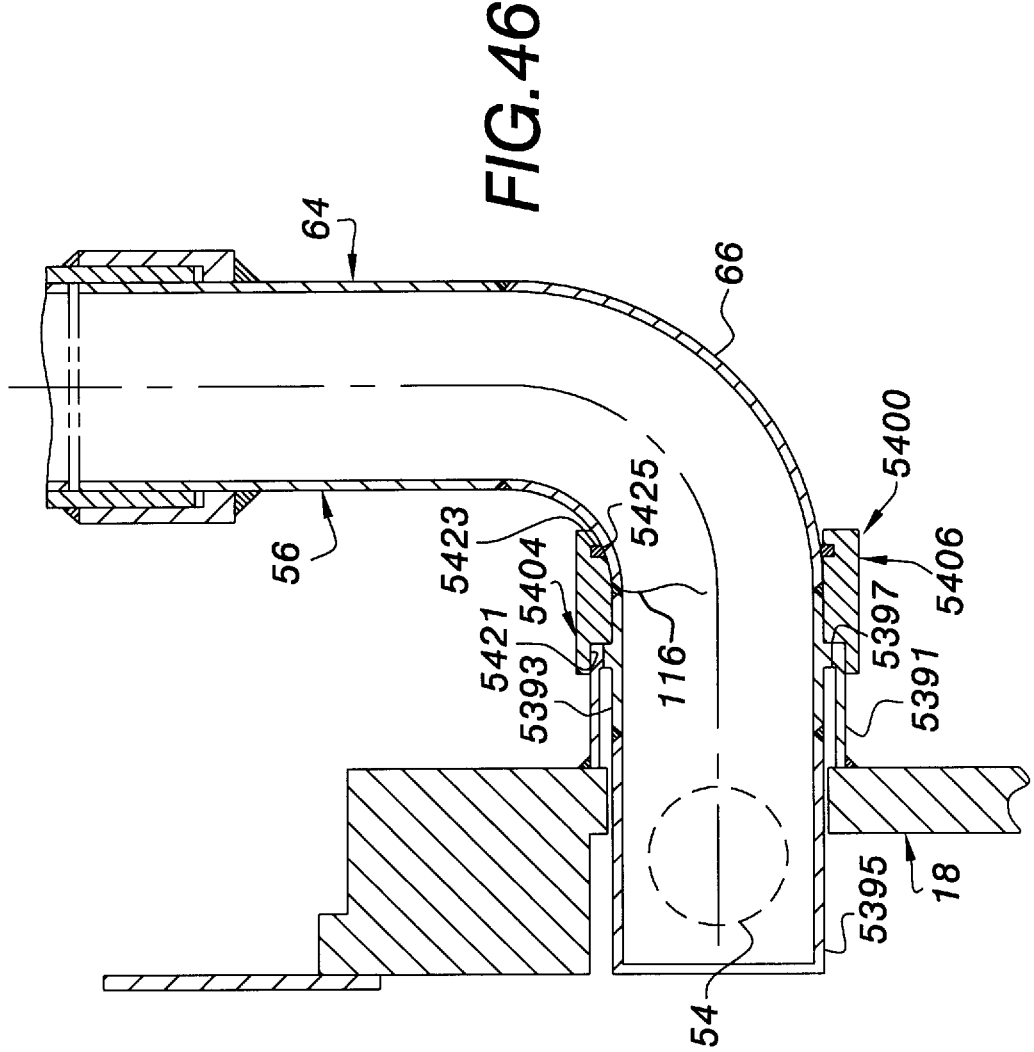

METHOD AND APPARATUS FOR REPAIRING CRACKED CORE SPRAY SUPPLY PIPING IN A BOILING WATER REACTOR

BACKGROUND OF THE INVENTION

1. Field of the Invention

The present invention relates generally to boiling water reactors and, more particularly, to a method and apparatus for repairing cracked core spray supply piping in a boiling water reactor.

2. Discussion of the Related Art

A typical boiling water nuclear reactor 10, as illustrated in FIG. 1, includes a reactor vessel 12, a core 14 made up of a plurality of fuel assemblies 16, and a core shroud 18 disposed concentrically within the reactor vessel around the core. Core shroud 18 includes upper and lower cylindrical sections 20 and 22 connected by a horizontal plate 24 extending radially inward from a bottom edge of the upper cylindrical section to an upper edge of the lower cylindrical section. A shroud head flange is welded to the upper edge of the shroud upper cylindrical section and extends radially inward to support a shroud head or lid 26 of generally hemispherical configuration, the lid being secured to the top of the shroud with bolts threadedly or otherwise engaged by lugs mounted in angularly spaced relation about the shroud periphery adjacent the upper edge of the shroud.

Fuel assemblies 16 are supported at the bottom by a core plate 28 mounted on a core plate support ring extending radially inward from the bottom edge of the lower cylindrical shroud section and at the top by a top guide 30 mounted on horizontal plate 24. Control rod guide tubes 32 are provided within vessel 12 at locations above a control rod driving mechanism extending through nozzles located at the bottom of the vessel beneath the shroud. Lower ends of corresponding control rods are detachably connected to the driving mechanism and are arranged to move up and down within the guide tubes.

Feedwater enters the reactor vessel via a feedwater inlet 34 and is distributed circumferentially within the reactor vessel by a ring-shaped pipe 36 disposed above the shroud and known as a feedwater sparger. The feedwater mixes with other water coming from the steam separators and flows downwardly from feedwater sparger 36 through the downcomer annulus 38, that is, the annular region between the reactor vessel and the core shroud, and ultimately enters the core lower plenum 40. A portion of the other downcomer water and feedwater is withdrawn from the reactor vessel via a recirculation water outlet 42 and is fed under pressure into a plurality of jet pump assemblies 44 distributed circumferentially about the core shroud to produce a forced convection flow through the core. Boiling is produced in the core creating a mixture of water and steam which enters the core upper plenum, that is the space under the shroud sealing lid, and is directed into steam plenum heads or stand pipes 46 mounted vertically on the shroud sealing lid in fluid communication with the core upper plenum. The mixture of water and steam flows through stand pipes 46 and enters a respective plurality of steam separators 48, which are shown as being of the axial-flow centrifugal type. The separated liquid water then mixes with incoming feedwater and flows downwardly to the core via the downcomer annulus. The steam, on the other hand, passes through a steam drying assembly or dryer 50 disposed above the steam separators and is withdrawn from the reactor vessel via a steam outlet 52.

In a loss-of-coolant accident, or LOCA, rupturing of the recirculation duct system or the steam duct system during operation can cause coolant water to flow out of the reactor vessel thereby lowering the water level in the reactor vessel and exposing the core such that the fuel assemblies may become overheated and damaged. In order to prevent overheating of the reactor core during a LOCA, tubular core spray spargers 54 of semi-circular configuration are oriented horizontally within the upper cylindrical section of shroud 18 above top guide 30 and are apertured at multiple locations to supply water to the core. These semi-circular core spray spargers are arranged in opposed pairs to form circular rings at two elevations, with core spray inlet or supply piping 56 connecting upper and lower pairs of core spray spargers with nozzles formed in the reactor vessel above shroud 18 at respective azimuthal locations. The connection at the core spray nozzle is made with a safe end assembly having a hollow, cylindrical safe end welded to the nozzle externally of the reactor vessel and a thermal sleeve which extends inwardly, toward the interior of the reactor vessel, from the safe end to a flow divider or T-box 58 disposed in the reactor vessel above the shroud. As best seen in FIG. 2, core spay supply piping 56 includes a pair of horizontal sections or arms 60 which extend circumferentially, in opposite directions, from T-box 58 to a pair of upper elbows 62 where the piping turns downwardly to connect with a pair of vertical sections 64. Each vertical section 64 of the piping extends downwardly from one of the upper elbows to a lower elbow 66 where the piping turns inwardly to penetrate through the shroud and connect with respective core spray spargers 54 disposed therein.

After periods of use, intergranular stress corrosion cracking of the core spray spargers and other sections of the core spray supply piping tends to occur as a result of corrosion, radiation and stress. The cracks usually occur in the heat-affected zones of the welds that join the typically austenitic stainless steel piping and associated components of the core spray supply system and are predominantly circumferential, with axial cracks occurring less frequently. Such cracking can lead to crack opening widths which permit significant leakage from the core spray spargers and the core spray supply piping. Leakage from the core spray spargers inside the shroud is typically not considered to be a major problem; however, when significant leakage from the core spray supply piping occurs outside the shroud, the piping must either be replaced or repaired.

Pipe replacement or change-out requires new piping, human resources and capabilities which must be thoroughly planned and scheduled well in advance of the project. There are major advantages of being able to operate through several scheduled reactor outages prior to pipe change-out so that the long outage required for such a massive project can be scheduled at an opportune time and adequate preparations can be made for evaluating all of the related plant changes.

Various remedies not requiring pipe change-out have been proposed in order provide assurance of structural integrity and reliability. One method involves the use of clamps which are held in place on the piping on either side of a cracked weld and urged toward one another to apply a compressive force to the piping in order to close the crack. Typically, the bolts used to tighten the individual clamps are oriented perpendicular to the tie-bolts holding the clamps on opposite sides of the cracked weld so that installation of the clamps requires access from more than one direction. During scheduled outages, repairs are preferably conducted from outside the reactor vessel using long-handled tools which are normally not designed for operation in more than one axial orientation such that custom tooling or frequent substitution of tools may be required. In addition, prior art pipe repairs have heretofore relied on friction or required difficult and time consuming machining of the pipes in order to hold the clamps in place on either side of the cracked weld.

SUMMARY OF THE INVENTION

Accordingly, it is a primary object of the present invention to provide an apparatus and method for repairing cracked core spray supply piping in a boiling water reactor so that the reactor can be safely operated without replacing or modifying the piping or while preparations are made to replace or modify the piping.

Another object of the present invention is to utilize only substantially straight, vertical operations when securing clamps to lengths of core supply piping on opposites sides of a crack and urging the clamps together to apply an axially compressive force or preload on the piping to close the crack.

Yet another object of the present invention is to apply and maintain an axially compressive force or preload along cracked core spray supply piping using clamps secured to the piping on opposite sides of the crack without relying on friction or obstructing the flow of core spray coolant through the piping.

An additional object of the present invention is to repair cracked core spray supply piping in a boiling water reactor using clamps secured to the piping with friction and provided with bosses having bores formed therethrough to facilitate subsequent pinning of the clamps relative to the piping if necessary.

A further object of the present invention is to maintain an axially compressive force or preload on cracked core spray supply piping during thermal transients by connecting a bolt in tension between clamps secured to the piping on opposite sides of a crack and holding a spring in compression between a head of the bolt and at least one of the clamps.

It is still another object of the present invention to convert vertical rotation of a long-handled tool to horizontal movement of a pair of clamp bodies by positioning a wedge within partially aligned openings formed through mating portions of the clamp bodies and tightening a bolt extending vertically through the wedge to cause the wedge to move downwardly in the partially aligned openings so that the bodies are drawn toward one another in the horizontal direction.

The present invention has another object in converting vertical rotation of a long-handled tool to horizontal movement of a pair of clamps by positioning a wedge within partially aligned openings formed in arms extending horizontally from the clamps and tightening a bolt extending vertically through the wedge to cause the wedge to move downwardly within the openings so that the clamps are moved toward one another in the horizontal direction.

Still a further object of the present invention is to maintain a wedge-tightening bolt in tension during thermal transients by positioning a spring in compression between a head of the bolt and a surface of the wedge.

Some of the advantages of the present invention over the prior art are that the repair is relatively inexpensive, that reactor shut-down time due to the repair is minimized, that radiation exposure is negligible for repair personnel, that design basis core spray delivery flow can be met without licensing basis changes, that the repair requires no in-vessel welding, that the clamps are easily removed when needed, that fit-up clearances are eliminated automatically during installation, that there is no significant infringement of existing reactor access space, and that the repair is not sensitive to temperature transients that tend to expand crack width openings and increase leakage.

The present invention is generally characterized in an apparatus for repairing cracked core spray supply piping in a boiling water reactor vessel including a pair of clamps extending circumferentially around the piping on opposite sides of a crack and a mechanism connected with the clamps for urging the clamps together to exert an axially compressive force along a longitudinal axis of the piping tending to close the crack disposed between the clamps thereby preventing leakage of coolant from the cracked core spray supply piping. At least one of the clamps includes a first jaw extending circumferentially around a first portion of the piping and including a first opening oriented substantially parallel to a longitudinal axis of the reactor vessel and an elongate channel oriented substantially perpendicular to and in communication with the first opening, a second jaw extending circumferentially around a second portion of the piping in opposed relation to the first jaw and including an elongate extension slidably received in the elongate channel and defining a second opening in partial alignment with the first opening, a wedge movably disposed in the aligned openings and including a cam surface oriented at an angle relative to the longitudinal axis of the reactor vessel to slidingly contact an edge of the second opening, and a mechanism for moving the wedge relative to the jaws in a direction substantially parallel to the longitudinal axis of the reactor vessel to cause the angled cam surface to slide against the edge of the second opening thereby moving the second jaw relative to the first jaw in a direction substantially perpendicular to the longitudinal axis of the reactor vessel to exert a radially compressive clamping force on the piping.

Another aspect of the present invention is generally characterized in an apparatus for repairing cracked core spray supply piping in a boiling water reactor vessel including a pair of clamps extending circumferentially around the piping on opposite sides of a crack and a mechanism for urging the clamps together in a direction substantially perpendicular to the longitudinal axis of the reactor vessel to apply an axially compressive preload along a longitudinal axis of the piping tending to close the crack, the preloading mechanism including a member carried by a first of the clamps for defining a first opening oriented substantially parallel to the longitudinal axis of the reactor vessel and an elongate channel oriented substantially perpendicular to and in communication with the first opening, a member carried by a second of the clamps for defining an elongate extension slidably received in the elongate channel and defining a second opening in partial alignment with the first opening, a wedge movably disposed in the aligned openings and including a cam surface oriented at an angle relative to the longitudinal axis of the reactor vessel to slidingly contact an edge of the second opening in the elongate extension, and a mechanism for moving the wedge relative to the aligned openings along the longitudinal axis of the reactor vessel to cause the angled cam surface of the wedge to slide against the edge of the second opening to urge the clamps together in a direction perpendicular to the longitudinal axis of the reactor vessel so as to exert an axially compressive force on the piping tending to close the crack thereby limiting leakage of coolant from the core spray supply piping.

Still another aspect of the present invention is generally characterized in an apparatus for repairing cracked core spray supply piping in a boiling water reactor having a reactor vessel with a core spray supply nozzle formed therein and a thermal sleeve extending through the nozzle from a safe end disposed externally of the reactor vessel to a flow divider disposed in the reactor vessel, the apparatus including a backing bar pivotally mounted within the reactor vessel and including a first end bearing against the flow divider and a second end bearing against the reactor vessel, and a mechanism for pivoting the second end of the backing bar away from the reactor vessel to cause the first end of the backing bar to apply an axially compressive force on the thermal sleeve via the flow divider tending to close any circumferential cracks perpendicular to the longitudinal axis of the thermal sleeve and/or the flow divider. In boiling water reactors including feedwater spargers mounted within the reactor vessel on brackets, the backing bar clamp can be mounted for pivotal movement about the feedwater sparger mounting brackets.

Yet an additional aspect of the present invention is generally characterized in an apparatus for repairing cracked core spray supply piping in a boiling water reactor including a pair of clamps extending circumferentially around the piping on opposite sides of a crack, a bolt connected between the clamps in tension to exert an axially compressive force on the piping tending the close the crack, and bias means disposed between the bolt and at least one of the clamps for maintaining a tensile preload on the bolt during thermal transients.

A further aspect of the present invention is generally characterized in a method of repairing cracked core spray supply piping in a boiling water reactor vessel including the steps of lowering a pair of clamps into the reactor vessel, securing the clamps to the piping on opposite sides of a crack, wherein at least one of the clamps has horizontally opposed jaws secured to a vertical section of the piping by driving a wedge vertically through partially aligned openings formed in relatively movable, mating portions of the opposed jaws, and urging the clamps together to exert an axially compressive force on the piping tending to close the crack and prevent leakage of coolant from the core spray supply piping.

An additional aspect of the present invention is generally characterized in a method of repairing cracked core spray supply piping in a boiling water reactor vessel including the steps of lowering a clamp into the reactor vessel, securing the clamp to a horizontal section of the piping adjacent a crack where the piping penetrates through a core shroud disposed within the reactor vessel to connect with core spray spargers within the shroud, and positioning a bias member between the clamp and the reactor vessel in compression to apply an axially compressive load on the horizontal section of piping in the direction of the shroud.

Still another aspect of the present invention is generally characterized in a method of repairing cracked core spray supply piping in a boiling water reactor vessel including the steps of lowering a pair of clamps carrying relatively movable, mating portions into the reactor vessel, securing the clamps to a horizontal section of the piping on opposite sides of a crack, aligning openings formed through the mating portions of the clamps so that they are partially aligned or overlap one another, and driving a wedge vertically through the partially aligned openings to bias the clamps toward one another in the horizontal direction thereby applying an axially compressive force along a longitudinal axis of the piping tending to close the crack and prevent leakage of core spray coolant from the core spray supply piping.

An additional aspect of the present invention is generally characterized in a method of repairing cracked core spray supply piping in a boiling water reactor vessel including the steps of mounting a backing bar with first and second ends for pivotal movement about a fulcrum attached to an inner surface of the reactor vessel, positioning the first end of the backing bar adjacent a flow divider connecting circumferential arms of the core spray supply piping with a thermal sleeve extending through a nozzle in the reactor vessel, positioning the second end of the backing bar adjacent the inner surface of the reactor vessel, and pivoting the second end of the backing bar away from the inner surface of the reactor vessel to cause the first end of the backing bar to pivot towards the inner surface of the reactor vessel and into contact with the flow divider in order to apply an axially compressive force on the thermal sleeve tending to close any circumferential cracks perpendicular to the longitudinal axis of the flow divider and the thermal sleeve.

Still a further aspect of the present invention is generally characterized in a method of repairing cracked core spray supply piping in a boiling water reactor vessel including the steps of lowering a pair of clamps into the reactor vessel, securing the clamps to the piping on opposite sides of a crack with at least one of the clamps carrying a boss with a bore formed therethrough in the direction of the piping, using the boss to form a hole through the piping in alignment with the bore, inserting a pin through the bore and into the hole in the piping, and urging the clamps together to apply an axially compressive force on the piping via the pin to close the crack and limit leakage from the core spray supply piping.

Other objects and advantages of the present invention will become apparent from the following description of the preferred embodiments taken with the accompanying drawings, wherein like parts in each of the several figures are identified by the same reference numerals or by reference numerals having the same last three digits.

BRIEF DESCRIPTION OF THE DRAWINGS

FIG. 7 is a side view, partly in section, of another vertical piping repair according to the present invention.

FIG. 8 is a sectional view taken through line 8—8 in FIG. 7.

FIG. 9 is a sectional view taken through line 9—9 in FIG. 7.

FIG. 10 is a sectional view taken through line 10—10 in FIG. 7.

FIG. 11 is a sectional view taken through line 11—11 in FIG. 7.

FIG. 14 is a sectional view taken through line 14—14 in FIG. 12.

FIG. 15 is a sectional view taken through line 15—15 in FIG. 13.

FIG. 16 is a sectional view taken through line 16—16 in FIG. 13.

FIG. 17 is a perspective view of another horizontal piping repair according to the present invention.

FIG. 18 is a top view, in plan, of the horizontal piping repair shown in FIG. 17.

FIG. 19 is a side view, partly in section, of the horizontal piping repair shown in FIG. 18.

FIG. 20 is a sectional view taken through line 20—20 in FIG. 18.

FIG. 21 is a sectional view taken through line 21—21 in FIG. 18.

FIG. 22 is a sectional view taken through line 22—22 in FIG. 19.

FIG. 23 is a sectional view taken through line 23—23 in FIG. 19.

FIG. 24 is a front view, in plan, of a backing bar for use with the horizontal piping repair shown in FIG. 19.

FIG. 25 is a side view of the backing bar shown in FIG. 24.

FIG. 26 is a top view of the backing bar shown in FIG. 24.

FIG. 27 is a front view, partly in section, of an upper elbow repair according to the present invention.

FIG. 28 is a top view, in plan, of the upper elbow repair shown in FIG. 27.

FIG. 29 is a side view of the upper elbow repair shown in FIG. 27.

FIG. 30 is a sectional view taken through line 30—30 in FIG. 27.

FIG. 31 is a sectional view taken through line 31—31 in FIG. 27.

FIG. 32 is a sectional view taken through line 32—32 in FIG. 27.

FIG. 33 is a sectional view taken through line 33—33 in FIG. 27.

FIG. 34 is a sectional view taken through line 34—34 in FIG. 27.

FIG. 35 is a sectional view taken through line 35—35 in FIG. 27.

FIG. 36 is a front view, partly in section, of a lower elbow repair according to the present invention.

FIG. 37 is a top view, in plan, of the lower elbow repair shown in FIG. 36.

FIG. 38 is a side view of the lower elbow repair shown in FIG. 36.

FIG. 39 is a sectional view taken through line 39—39 in FIG. 36.

FIG. 40 is a sectional view taken through line 40—40 in FIG. 36.

FIG. 41 is a sectional view taken through line 41—41 in FIG. 36.

FIG. 42 is a sectional view taken through line 42—42 in FIG. 36.

FIG. 43 is a sectional view taken through line 43—43 in FIG. 36.

FIG. 44 is a sectional view taken through line 44—44 in FIG. 36.

FIG. 45 is a sectional view taken through line 45—45 in FIG. 36.

FIG. 46 is an enlarged fragmentary sectional view of the lower elbow repair shown in FIG. 36.

DESCRIPTION OF THE PREFERRED EMBODIMENTS

The method and apparatus of the present invention are described hereinafter for use in repairing cracks in the piping connecting the core spray nozzles with core spray spargers in a boiling water reactor. It will be appreciated, however, that the method and apparatus according to the present invention can be used to repair cracks occurring in other piping components of the core spray supply system such as, for example, the core spray spargers inside the core shroud as well as other in-vessel piping including, but not limited to, the feedwater spargers disposed above the core shroud and the jet pump recirculation system piping in the annular space between the core shroud and the reactor vessel.

Figure 1:
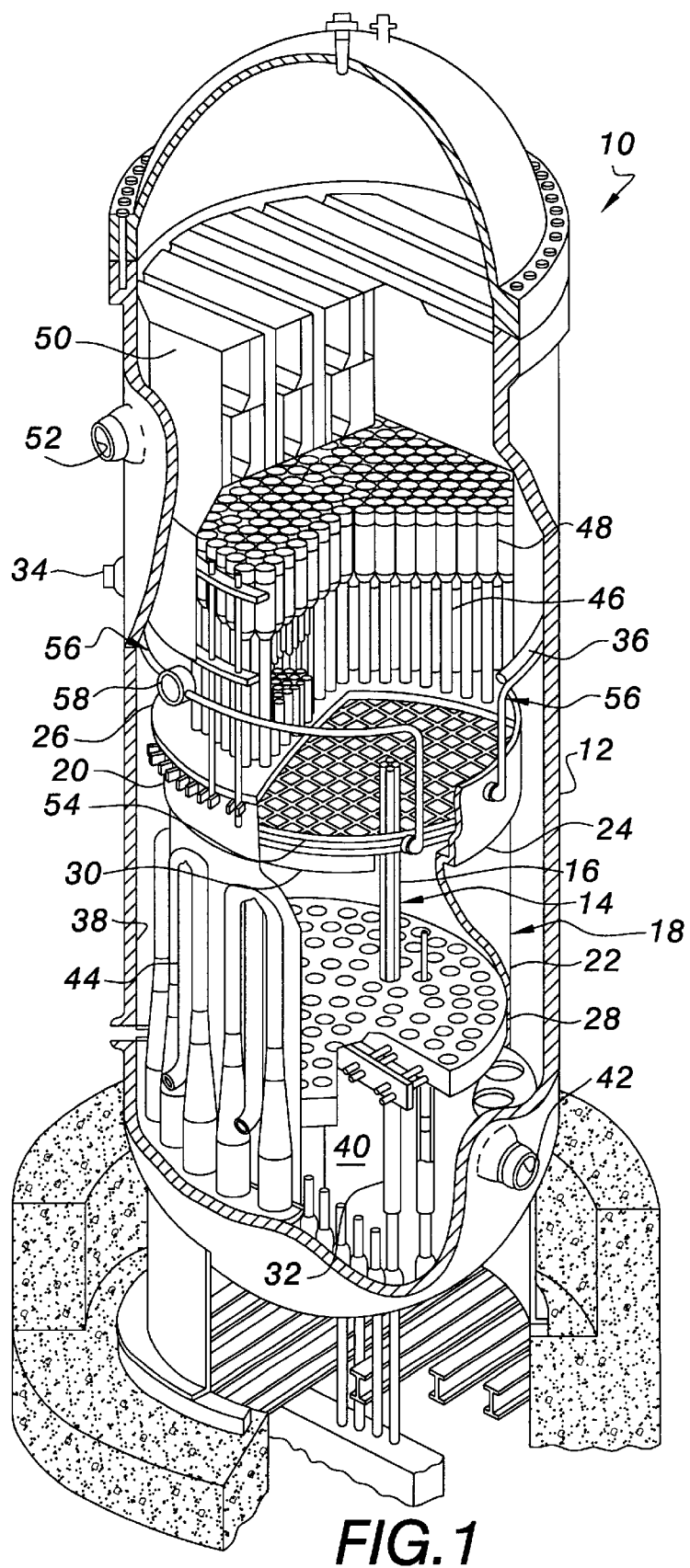
FIG. 1 is a cut away view in perspective of a boiling water reactor exemplifying a type of reactor suitable for repair by the method and apparatus of the present invention.
Figure 2:
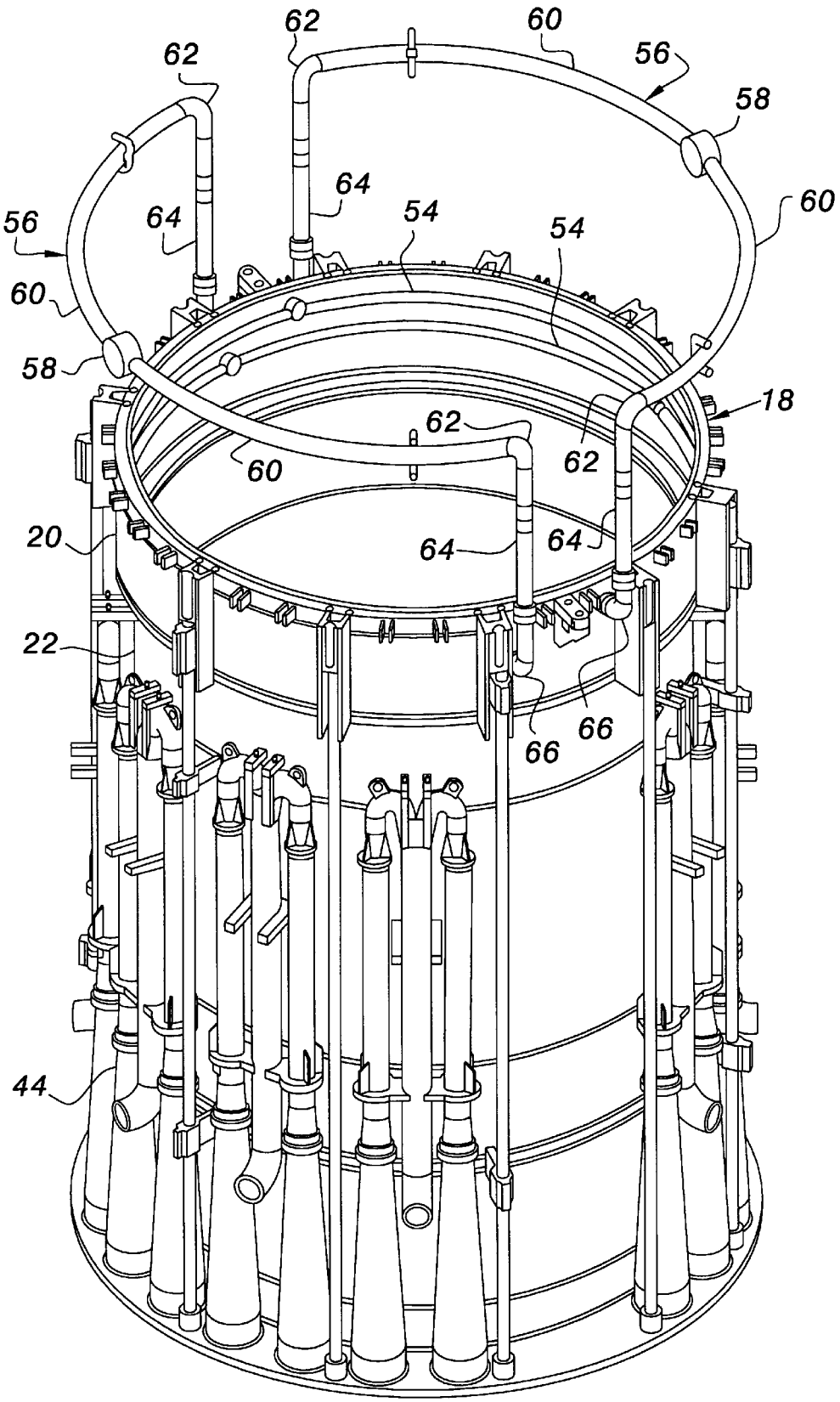
FIG. 2 is a perspective view of core spray supply piping and a cylindrical core shroud typical of a boiling water reactor.
Figure 3:
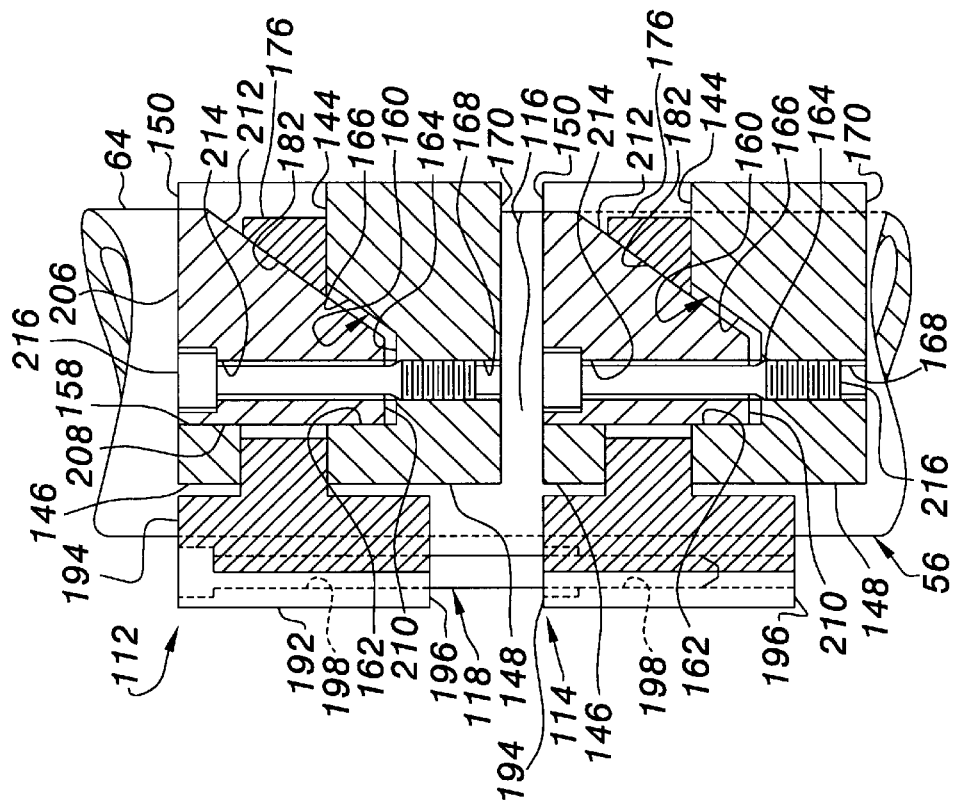
FIG. 3 is a side view, partly in section, of a vertical piping repair according to the present invention.
Figure 4:
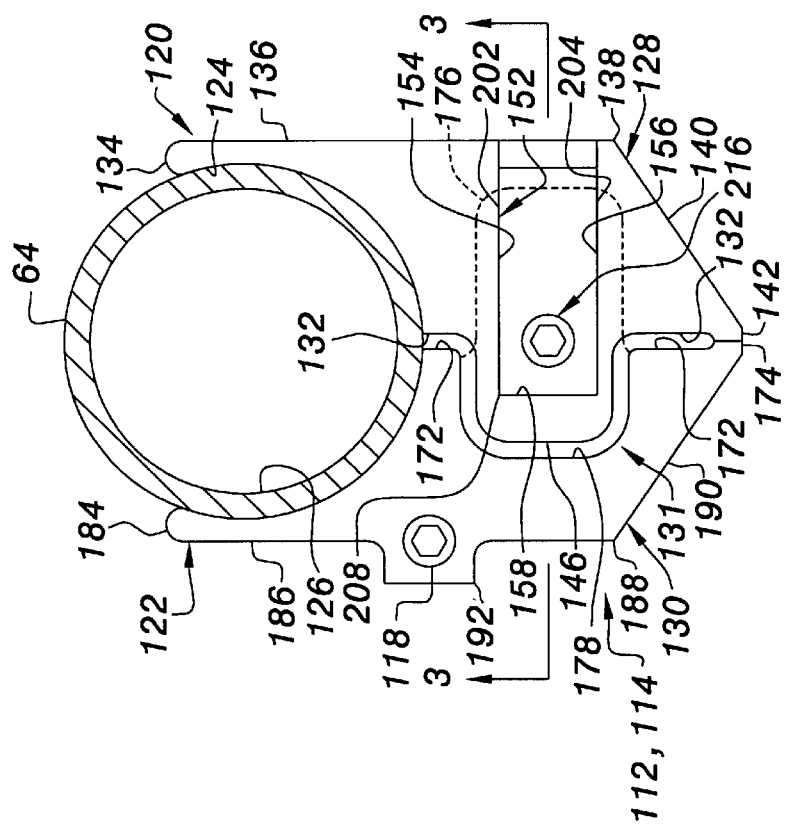
FIG. 4 is a top view, in plan, of the vertical piping repair shown in FIG. 3.
Figure 5:
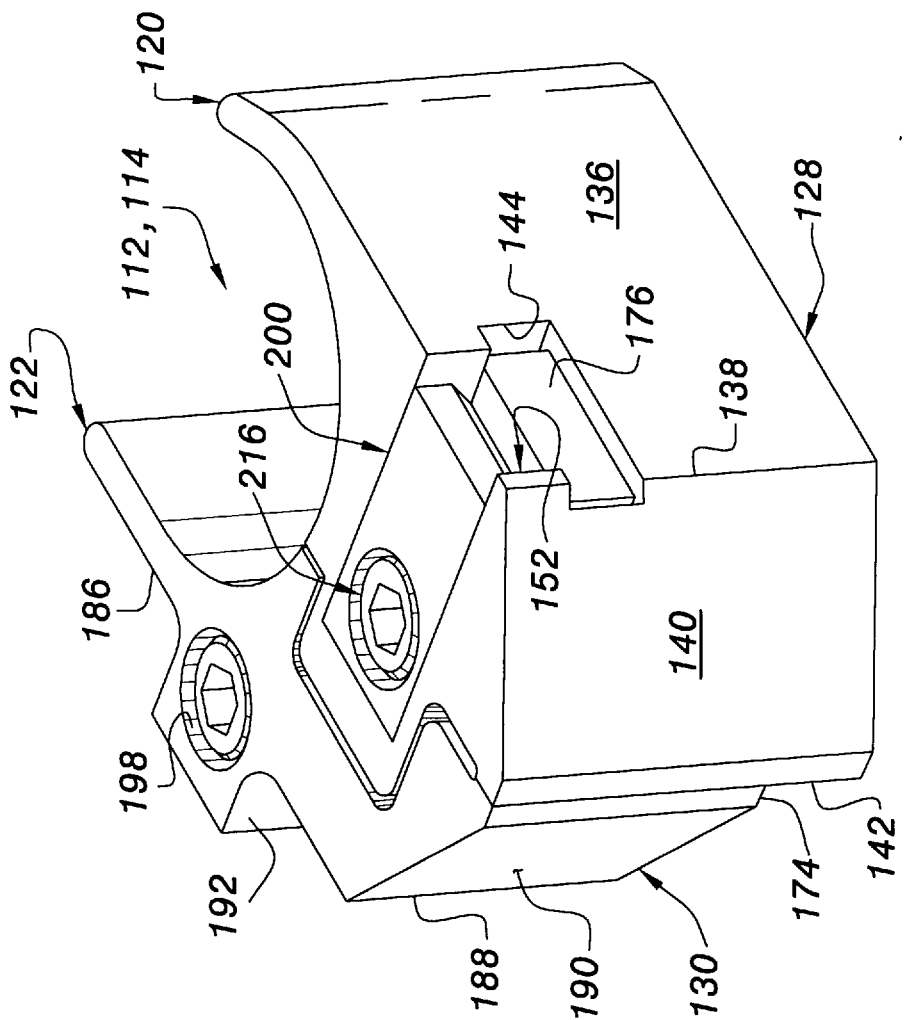
FIG. 5 is a perspective view of a clamp for use in repairing cracked core spray supply piping according to the present invention.

An apparatus 110 for repairing cracked core spray supply piping in a boiling water reactor according to the present invention, as illustrated in simplified form in FIGS. 3 and 4, includes a pair of clamps 112 and 114 extending circumferentially around one of the vertical sections 64 of the core spray supply piping 56 on opposite sides of a crack 116 and a preloading member or mechanism 118 in the form of a tie-bolt connected between the clamps in tension to apply an axially compressive force or preload on the piping tending to close the crack.

Referring to FIGS. 3–6, each of the clamps 112 and 114 includes a pair of clamp bodies or jaws 120 and 122 with opposed concave surfaces 124 and 126 of arcuate configuration extending circumferentially around the piping in opposite directions from mating body portions 128 and 130, and a clamping mechanism 131 extending between the body portions to draw the jaws together around the piping. Arcuate surface 124 of jaw 120 preferably extends about 135° in a counterclockwise direction, looking at FIG. 4, from an inner surface or face 132 of body portion 128 to a proximal end 134 where the jaw turns outwardly, away from the piping, to connect with an outer surface or face 136 of the body portion. Outer surface 136 extends substantially in parallel with inner surface 132 from proximal end 134 of the jaw to a shoulder 138 where the outer surface intersects a distal surface or face 140 oriented at an obtuse angle relative to the outer surface, the distal surface extending from the shoulder to an inwardly protruding lip or ridge 142 oriented vertically at the distal end of the inner surface of body portion 128.

An elongate channel or passage 144 of generally rectangular configuration in longitudinal and transverse cross-section is formed through the main body portion of jaw 120 as part of the clamping mechanism 131 and extends horizontally through the main body portion in perpendicular relation to inner and outer surfaces 132 and 136, with a pair of vertically spaced, horizontal projections or fingers 146 and 148 of generally rectangular, bar-like configuration extending inwardly, in the direction of opposed jaw 122, from above and below the elongate channel, respectively. The horizontal projection 146 above elongate channel 144 is disposed between the channel and a top surface or face 150 of body portion 128 oriented substantially perpendicular to the longitudinal axis of the piping. An elongate opening or slot 152 of the clamping mechanism is formed vertically through top surface 150 of the main body portion in communication with the elongate channel and is defined by spaced, parallel edges or walls 154 and 156 of vertical orientation extending perpendicularly inward from outer surface 136 of jaw 120 to a transverse edge or wall 158 of vertical orientation spaced from a periphery of the uppermost horizontal projection 146 to define a vertically oriented abutment surface. A generally trapezoidal recess 160 of the clamping mechanism extends downwardly from the channel in vertically opposed relation to opening 152 and is defined by a pair of spaced, parallel walls (not labelled) vertically aligned with edges 154 and 156 of the elongate opening, a vertical wall 162 extending downwardly from the elongate channel in vertical alignment with edge 158 of the slotted opening, and a bottom wall 164 oriented parallel to top surface 150 of jaw 120 and extending from the bottom of recess wall 162 in an outward direction to connect with an angled wall 166 of the recess oriented at an obtuse angle relative to the bottom wall. An internally threaded hole 168 extends downwardly from bottom wall 164 of the recess to a bottom surface or face 170 of jaw 120 and is oriented vertically, that is, parallel to the longitudinal axis of the reactor vessel.

Inner surface 172 of body portion 130 of jaw 122 faces the inner surface of body portion 128 of jaw 120 and extends distally, away from the piping, from arcuate surface 126 to an inwardly protruding lip or ridge 174 configured to abut lip 142 of jaw 120 when the body portions are assembled together as shown, for example, in FIG. 4. Inner surfaces 132 and 172 of the mating clamp bodies are generally spaced apart in the assembled condition so that jaws 120 and 122 will tend to pivot about the axis or fulcrum defined by the abutting lips 142 and 174.

An elongate extension, tongue or bar 176 of generally flat, rectangular configuration extends inwardly, in a horizontal direction perpendicular to inner surface 172, from a pair of generally rectangular recesses 178 and 179 formed in the inner surface of the main body portion of jaw 122 above and below the extension respectively. The elongate extension 176 is aligned with elongate channel 144 in the opposed jaw 120; and, as best seen in FIG. 3, the elongate extension or bar is configured to slide horizontally within the elongate channel as a component of the clamping mechanism when mating body portions 128 and 130 of jaws 120 and 122 are assembled together. An elongate aperture or opening 180 of generally rectangular configuration is formed vertically through elongate extension 176 and includes a pair of vertically oriented surfaces or edges 179 and 181 of spaced, parallel configuration extending longitudinally between a vertically oriented surface or edge 183 oriented perpendicular to the longitudinal axis of the extension and an angled or beveled surface or edge 182 at the inner end oriented substantially parallel to the angled surface 166 of the trapezoidal recess 160 in the opposed body portion of jaw 120 when the elongate extension is disposed within the elongate channel.

Arcuate surface 126 of jaw 122 preferably extends about 90° in a clockwise direction, looking at FIG. 4, from inner surface 172 of body portion 130 to a proximal end 184 where the jaw turns outwardly, away from the piping, to connect with an outer surface or face 186. Outer surface 186 extends substantially in parallel with inner surface 172 of the jaw from proximal end 184 to a shoulder 188 where the outer surface intersects a distal surface or face 190 oriented at an obtuse angle relative to the outer surface, the distal surface extending from the outer surface of the jaw 122 to the inwardly protruding lip 174 at the distal end of the inner surface. A rib or boss 192 of generally rectangular configuration is disposed along the outer surface of jaw 122 intermediate proximal and distal ends of the jaw and extends vertically between opposed top and bottom surfaces or faces 194 and 196 of the jaw, with a through-hole 198 being formed vertically through the boss to receive tie-bolt 118.

Clamping mechanism 131 further includes a wedge 200 with spaced, parallel surfaces or faces 202 and 204 of generally trapezoidal shape oriented vertically or parallel to the longitudinal axis of the reactor vessel and spaced to slide within openings 180 and 152, a top surface 206 of generally rectangular configuration oriented horizontally or perpendicular to the longitudinal axis of the reactor vessel, an inner surface or face 208 of generally rectangular configuration extending vertically downward from top surface 206 to a generally rectangular bottom surface 210 of smaller lateral dimension or width than the top surface, and an angled or beveled surface 212 extending between the top and bottom surfaces at an angle relative to the longitudinal axis of the reactor vessel to be oriented substantially parallel to inner edge 182 of the opening in the elongate extension 176. A through-hole 214 extends vertically through the wedge in alignment with threaded opening 168 of body portion 128, and a clamp tightening bolt 216 extends through the hole in the wedge to be threadedly received within hole 168 in the body portion.

Figure 6:
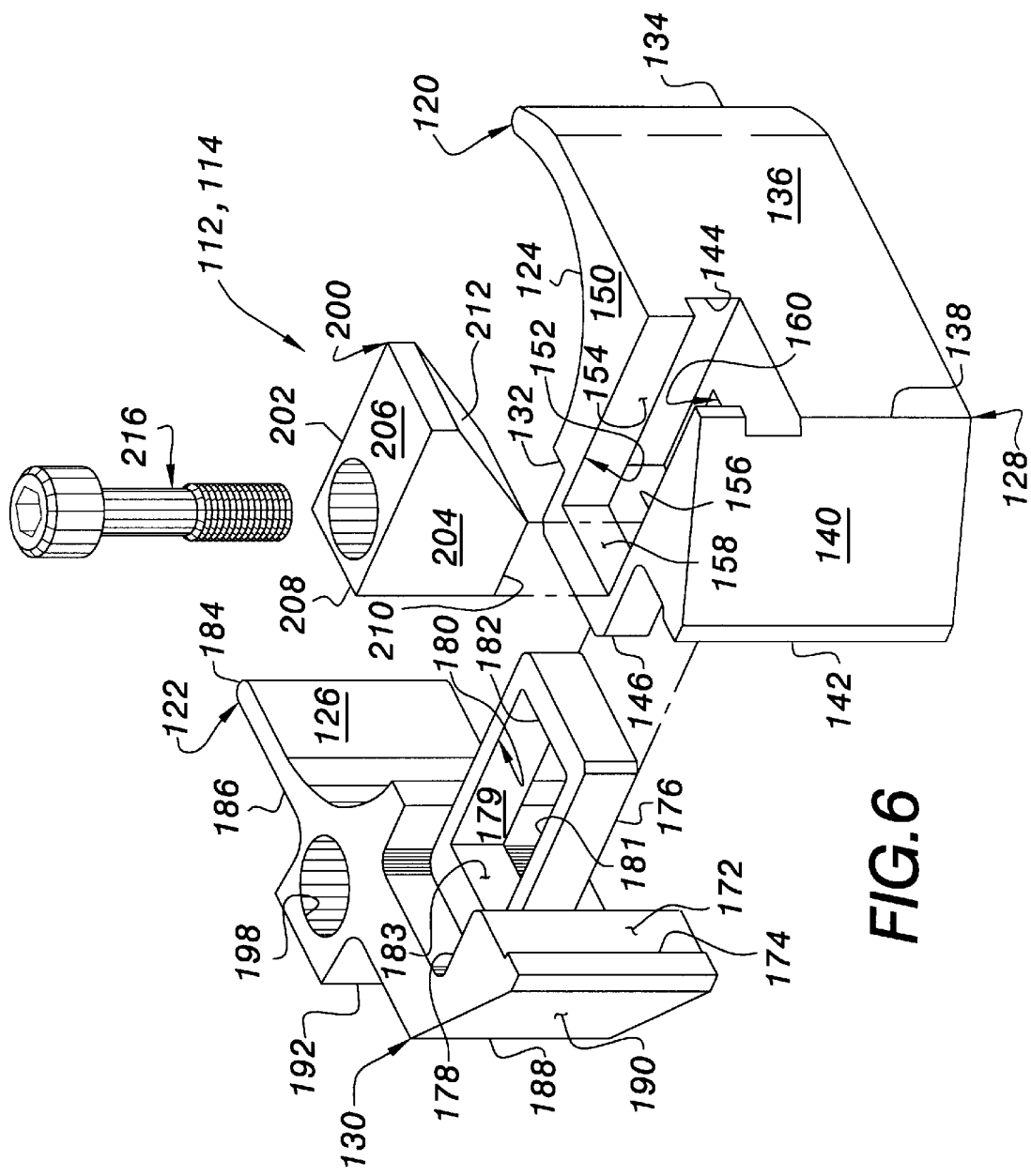
FIG. 6 is an exploded perspective view of the clamp shown in FIG. 5.

In use, clamps 112 and 114 are assembled by positioning jaws 120 and 122 in opposed relation such that inner surfaces of body portions 128 and 130 face one another as shown in FIG. 6, and by inserting the elongate extension 176 of jaw 122 into the elongate channel 144 formed through jaw 120 until projections 146 and 148 of jaw 120 are received within recesses 178 and 179 of jaw 122, respectively, and opening 180 in the elongate extension 176 overlaps or is partially aligned with opening 152 in the top of jaw 120. The bottom or tapered end of wedge 200 is then inserted through the aligned portions of openings 144 and 152 with vertical sides 202, 204 and 208 of the wedge sliding along peripheral edges 154, 156 and 158 of the slotted opening 152 and the angled surface 212 of the wedge sliding against the angled peripheral edge 182 at the inner end of the opening in elongate extension 176. The wedge is held in place within the partially aligned openings by inserting the threaded end of bolt 216 through the hole 214 in the wedge into the cooperatively threaded opening 168 at the bottom of the wedge recess in jaw 120, and by loosely tightening the bolt to permit some movement of the jaws relative to one another about the pivot axis or fulcrum defined by lips 142 and 174.

Clamps 112 and 114 can be lowered into the reactor vessel separately and secured individually to the vertical section of piping 56 on opposite sides of crack 116 but are preferably secured together with tie-bolt 118 and attached to the bottom end of a long-handled tool to be lowered into the reactor vessel, for example from a refuel bridge disposed above the reactor vessel. The uppermost clamp 112 of the repair apparatus 110 can be allowed to slide freely along tie-bolt 118 as shown but is preferably prevented from sliding by use of a spacer or snap-ring as will be described in greater detail below. The clamps are moved toward the cracked section of piping by remote manipulation of the long-handled tool; and, if necessary, jaws 120 and 122 of one or both clamps can be spread apart prior to being placed around the piping to provide clearance for their arcuate surfaces to be positioned on opposite sides of the piping, for example by inserting a second tool into the gap between inner surfaces 132 and 172 of the mating body portions using the tool like a wedge to spread the jaws apart. The clamps are positioned against the piping with arcuate surfaces 124 and 126 extending circumferentially around the piping in horizontally opposed relation as shown, for example, in FIG. 4. When the clamps are properly positioned relative to crack 116, clamp tightening bolts 216 are oriented vertically with their heads facing upwardly to permit tightening or torquing of the bolts with long-handled tools lowered into the reactor vessel and having appropriate drivers at a bottom end to engage the respective heads of the bolts. More specifically, a driver at the bottom end of a long-handled tool is coupled with the head of one of the bolts and is rotated about a vertical axis to cause the bolt to draw or drive wedge 200 downwardly within openings 152 and 180, looking at FIG. 3, toward recess 160 formed in jaw 120, with vertical surfaces 202, 204 and 208 of the wedge sliding along peripheral edges of slotted opening 152 and the angled surface 212 of the wedge exerting a compressive force on the angled peripheral edge 182 of opening 180 in the elongate extension, the force having a component in a direction parallel to elongate channel 144 and perpendicular to the vertical axis of rotation of the tools. Surfaces 158 and 182 of the originally partially aligned openings are spread apart as the wedge is driven downwardly through the openings, causing elongate extension 176 to be moved toward the outer surface of body portion 128 along the elongate channel, with jaw 122 moving with the elongate extension in the direction of jaw 120. Tightening of clamping bolts 216 is discontinued when opposed arcuate surfaces 123 and 126 of the clamp securely engage the piping to prevent axial slippage.

With clamps 112 and 114 positioned securely on opposite sides of crack 116, the same or a different long-handled tool can be used to tighten tie-bolt 118, for example by engaging the head of the tie-bolt with a driver at the bottom of the long-handled tool and rotating the driver about a vertical axis to cause a lower end of the tie-bolt to be threaded downwardly into a cooperatively configured portion of the hole 198 formed in the lower clamp. The head of the tie-bolt is preferably received within a countersink formed in the upper clamp so that tightening of the tie-bolt places the tie-bolt in tension between the clamps thereby urging the clamps together along the longitudinal axis of the piping and applying an axially compressive force or preload on the piping to urge opposed surfaces of the crack against one another and into sealing contact. In addition, a bias member (such as spring 5444 in FIG. 36) can be placed in compression between the head of the tie-bolt and the upper clamp, preferably within the countersink, to maintain the preload during thermal transients which would otherwise tend to reduce tension on the tie-bolt.

It will be appreciated that all of the foregoing installation steps can be performed from locations above the reactor vessel using conventional long-handled tools designed for vertical access only. As a result, the method and apparatus according to the present invention eliminates the need for right angle drivers and expensive custom tooling while at the same time minimizing exposure of personnel to potentially hazardous radiation within the reactor vessel. Furthermore, the repair is relatively insensitive to temperature transients that would otherwise tend to open up cracks and increase leakage, for example when cold water is injected into the core spray supply piping while the reactor is hot, because tensile forces generated by such transients are offset by the compressive preload applied to the piping as part of the repair.

A preferred embodiment of an apparatus for repairing cracks in vertical sections of core spray supply piping according to the present invention, as illustrated in FIGS. 7–11 at 1110, is similar to the repair apparatus described above but with lug pins 1220 extending inwardly from arcuate surfaces 1124 of the clamps 1112 and 1114 into holes 1222 formed in the piping and vertical support members or extensions 1224, 1226 and 1228 of channel-like configuration extending from the clamps to assure proper vertical spacing and alignment of the clamps during installation and to provide lateral support for the piping in the event of bending.

Lug pins 1220 can be formed integrally with jaws 1120 as a one-piece unit but are preferably formed separately of the jaws and mechanically coupled therewith, for example using cooperatively threaded components and locking cups as shown in FIG. 8. Each lug pin 1220 includes an externally threaded shank 1230 of cylindrical configuration extending from a head or cap 1232 of greater diameter than the shank to a smooth-sided cylindrical plug 1234 of smaller diameter than the shank. Jaw 1120 of each clamp is provided with a generally rectangular boss 1236 with a bore 1238 formed therethrough having a generally cylindrical outer portion 1240 configured to receive the head of the lug pin and extending inwardly from an outer end of the boss to an intermediate portion 1242 of smaller diameter than the outer portion, the intermediate portion being threaded to receive the shank of the lug pin. The intermediate portion 1242 extends inwardly, in the direction of the piping, from outer portion 1240 to a smooth-sided cylindrical inner portion 1244 of smaller diameter than the intermediate portion. The smooth-sided cylindrical plug 1234 of the lug pin is longer than the inner portion 1244 of the bore formed through the jaw such that, when lug pin 1220 is threadedly engaged in bore 1238, a tip or inner end 1246 the plug will protrude from the jaw into the hole formed in the piping to carry full axial design loads without reliance on friction but will not protrude inwardly beyond the inner diameter of the piping to minimize flow obstruction.

Plug 1234 of the lug pin is preferably of smaller cross-sectional dimension than hole 1222 to allow for machining tolerances in the hole and the lug pin and to provide clearance during installation. For example, if plug 1234 and hole 1222 are circular, the plug could have a diameter of about 1.0 inches with the hole being formed with a diameter of about 1.5 inches or any other suitable diameter equal to or greater than the diameter of the plug. Arcuate surface 1124 of jaw 1120 is preferably configured to fit conformally and be held tightly against the outer surface of the piping in the area around plug 1234 to provide a limited leakage seal preventing excessive leakage from the annular space or gap between the outer surface of the lug pin and the inner surface of the hole in the piping.

Support members 1224 and 1226 are formed integrally with and extend upwardly from jaws 1122 of each clamp in the vertical direction; and, as best seen in FIGS. 9 and 10, each of the support members is preferably a generally C-shaped channel section with a pair of spaced, parallel sides or flanges 1248 and 1250 extending perpendicularly from opposite edges of a cross member or web 1252 in a proximal direction, that is, toward piping 56, to be disposed on opposite sides of the piping. About half of web 1252 and all of flange 1248 of each support member overlie or extend over jaws 1120 with a small vertical clearance to permit unobstructed movement of the support members with jaws 1122.

Referring again to FIG. 7, it can be seen that tie-bolt boss 1192 extends vertically upward along the intersection of web 1252 and flange 1250 and terminates slightly above the support member to permit standard long-handled tools to couple with the boss in order to achieve proper alignment of the tools with the tie-bolt 1118. Similarly, a generally rectangular boss 1254 extends vertically upward, in a direction perpendicular to top face 1206 of wedge 1200, to align tools with clamp tightening bolt 1216.

Vertical support member 1228 extends downwardly from the bottom surface 1196 of jaw 1122 of clamp 1112; and, as best seen in FIG. 11, the downwardly extending vertical support member is a generally C-shaped channel section with a pair of spaced, parallel sides or flanges 1256 and 1258 disposed vertically on opposite sides of piping 56 and a cross member or web 1260 extending perpendicularly from a distal edge of flange 1256 to a diagonal surface or face 1262 joining the cross-member with flange 1258, the diagonal face being radially or laterally spaced from tie-bolt 1118 to allow unobstructed passage of the tie-bolt. Referring again to FIG. 7, it can be seen that upwardly extending support member 1226 of clamp 1114 is provided with a rectangular finger or key 1264 which extends perpendicularly upward from a top edge of the web 1252 to be received within a cooperatively configured recess or keyway 1266 formed along the bottom edge of downwardly extending support member 1228 thereby keying the clamps to assure proper angular alignment of the tie-bolt holes 1198 during installation. Although not shown, it will be appreciated that a lug pin can be carried on one or more of the channel-shaped support members, for example in web portions thereof, in which case the inner surface of the channel section in the area around the pin is preferably configured to fit conformally and be held tight against the piping in the area around the pin to form a limited leakage seal.

To prevent the upper clamp 1112 from sliding along tie-bolt 1118 when not secured to the piping, a snap ring 1270 is mounted in a groove 1272 formed in tie-bolt 1118 adjacent an annular recess 1274 formed in bottom surface 1196 of jaw 1122 around tie-bolt opening 1198. Similar snap rings 1276 are mounted in grooves formed in clamping bolts 1216 to prevent respective wedges 1200 from falling in the event the clamping bolt is loosened at some point during installation or removal.

Assembly and installation of the repair apparatus 1110 proceeds essentially as described above with the exception of forming holes 1222 in the piping 56 to receive pins 1220. Holes 1222 can be formed prior to installing the clamps 1112 and 1114; however, under certain circumstances it may be preferred for the clamps to be secured to the piping 56 with pins 1220 removed prior to forming the holes so that bosses 1236 can be used to precisely locate the holes where the pins will be positioned. The holes can be formed using any suitable technique including, but not limited to, mechanical drilling and EDM techniques wherein the tool couples with the boss to assure proper alignment and a plunge cut is made through the wall thickness of the piping via the bore. After the holes 1222 are formed, pins 1220 can be inserted into bores 1238 and tightened to cause the tip 1246 of each pin to protrude into a corresponding hole. Preferably, bore 1238 is configured to define a stop or abutment preventing the tip 1246 of the pin from advancing further than the inside diameter of the piping to avoid obstructing the flow of coolant water through the piping.

Once clamps 1112 and 1114 are secured to the piping and pins 1220 are inserted into the holes formed in the piping, tie-bolt 1118 may be tightened in the manner described above to apply an axially compressive preload to the piping to close the crack. As the tie-bolt is tightened, clamps 1112 and 1114 are drawn towards one another in a direction parallel to the longitudinal axis of the piping, with pins 1220 transferring the load from the clamps to the piping. Vertical support members or extensions 1224, 1226 and 1228 are not tightened around the piping; however, as the clamps are tightened, the piping may be moved into contact with one of the flanges, as shown for example in FIG. 9, and thus be stiffened against subsequent bending or buckling. Support member 1228 extending downwardly from clamp 1112 can also be used as a vertical stop to limit the axially compressive preload applied to the piping.

An apparatus 2110 for repairing horizontal sections of core spray supply piping in accordance with the present invention, as illustrated in FIGS. 12–16, includes a pair of clamps 2112 and 2114 extending circumferentially around the piping 56 on opposite sides of a crack 116 and a preloading mechanism 2118 connected horizontally between the clamps in tension to urge the clamps toward one another in order to apply a compressive force or preload to the piping to close the crack. As best seen in FIG. 14, the clamps 2112 and 2114 each include a pair of jaws 2120 and 2122 with vertically opposed arcuate surfaces 2124 and 2126, respectively, extending circumferentially around the piping and a clamping bolt 2216 extending vertically through the jaws to secure the clamps to the piping. Jaw 2122 is shown as a generally C-shaped channel section with spaced, parallel flanges 2280 and 2282 extending perpendicularly from a vertically oriented web 2284 to be disposed above and below the piping, respectively. Each of the jaws 2120 is movably disposed in a slot 2286 formed in the upper flange 2280 of one of the channel sections and includes a mating body portion 2128 with a lip or ridge 2142 protruding downwardly therefrom to be received in a groove or recess 2174 formed in the channel section or jaw 2122 to define a fulcrum about which the jaws can pivot when the clamping bolt is tightened. Lug pins 2220 extend vertically downward through the uppermost jaw 2120 of each clamp and are received within holes 2222 formed vertically through the piping, for example using EDM techniques in the manner described above.

Horizontal preloading mechanism 2118 is similar to the clamping mechanism 1131 used to secure clamps 1112 and 1114 to vertical sections of piping in that it allows horizontally opposed components of the repair apparatus to be drawn together in a horizontal direction perpendicular to the longitudinal axis or direction of the reactor vessel when a fastener is rotated about a vertical axis parallel to the longitudinal axis or direction of the vessel. The horizontal preloading mechanism is disposed between clamps 2112 and 2114 and includes a pair of blocks or arms 2288 and 2290 extending inwardly, toward one another, from outboard or distal ends of jaws 2122. An elongate channel or passage 2292 is formed horizontally through block 2290 with a slotted opening 2294 being formed vertically through the top surface of the block in communication with the elongate channel and a pair of horizontal protrusions 2296 and 2298 projecting inwardly from above and below the channel, respectively. An elongate extension or bar 2300 of generally flat, rectangular configuration extends perpendicularly from between a pair of vertically spaced, generally rectangular recesses 2301 and 2302 formed in block 2288 and includes an opening 2304 with an angled peripheral edge 2305, the elongate extension being configured to slide within the elongate channel such that openings 2294 and 2304 can be partially aligned initially to slidingly receive a wedge 2306 therein similar to the wedge 1200 described above. A wedge-tightening bolt 2308 extends downwardly through wedge 2306 in a vertical direction to be threadedly received in an opening 2310 formed through the bottom of block 2290.

In use, clamps 2112 and 2114 are assembled by placing upper jaws 2120 in slots 2286 formed in lower jaws 2122 and threading clamping bolts 2216 through mating portions of the jaws to hold the jaws together. Clamps 2112 and 2114 are then connected together by inserting elongate extension 2300 in channel 2292 such that openings 2304 and 2294 are partially aligned and securing wedge 2306 in the partially aligned openings with preload bolt 2308. Head 2309 of the bolt 2308 is preferably seated within a countersink formed in the top surface of the wedge, with a bias member (such as spring 5444 in FIG. 36) held in compression between the head of the bolt and the top of the wedge to assist in maintaining a preload on the bolt during thermal transients and the like. The assembled apparatus 2110 can then be lowered into the reactor vessel to position clamps 2112 and 2114 around a horizontal section 60 of the core spray supply piping on opposite sides of the crack 116 with clamping bolts 2216 and bosses 2236 facing upwardly in the vertical direction. Clamps 2112 and 2114 are secured to the piping by tightening bolts 2216 and inserting pins 2220 through the bosses and into holes 2222 formed through the piping. As bolts 2216 are tightened, the arcuate surface of each jaw 2120 is drawn tightly against the outer surface of the piping to provide a limited leakage seal in the area around pin hole 2222 while a relatively flat portion of concave surface 2126 of each jaw 2122 is drawn against a diametrically opposed side of the piping for stability. Once the clamps are secured, a long-handled tool can be used to turn bolt 2308 of the preloading mechanism so that the wedge 2306 is moved downwardly, looking at FIG. 13, within the aligned portions of openings 2294 and 2304 to cause opposite ends of the openings to move apart in a horizontal direction perpendicular to the longitudinal axis of the reactor vessel as described above in connection with clamping mechanisms 131 and 1131. Clamps 2112 and 2114 are thus drawn toward one another to apply a substantially axial compressive preload to the piping in order to hold opposed surfaces of the crack 116 together in sealing relation.

Figure 12:
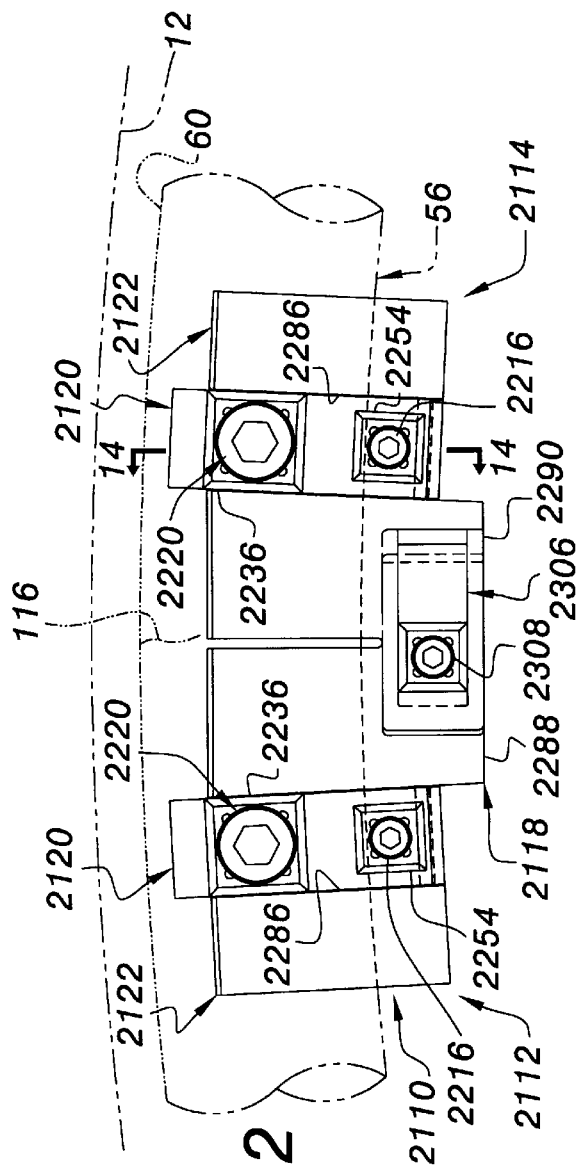
FIG. 12 is a top view, in plan, of a horizontal piping repair according to the present invention.
Figure 13:
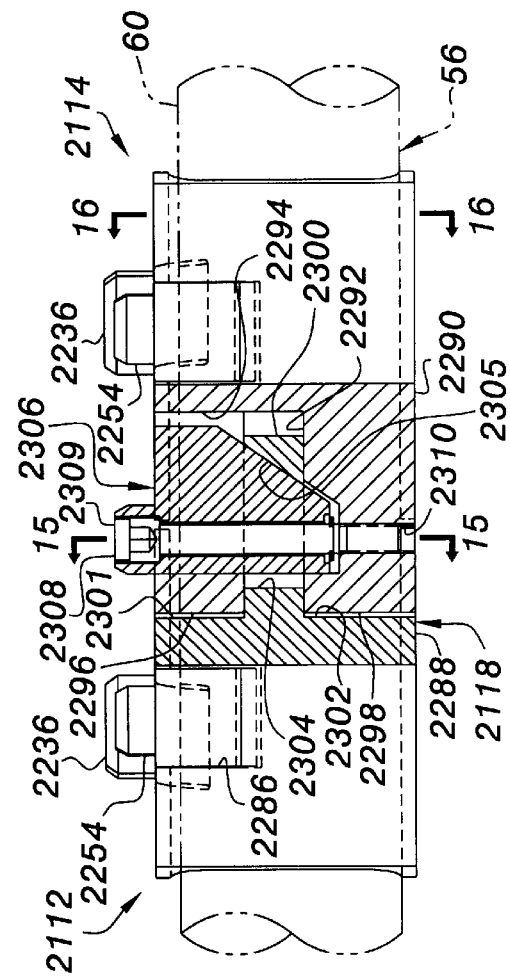
FIG. 13 is a side view, partly in section, of the horizontal piping repair shown in FIG. 12.

Another modification of the apparatus according to the present invention for repairing cracks in the weldments joining horizontal arms 60 of the core spray supply piping 56 with a flow divider or T-box 58 of generally cylindrical configuration is shown in FIGS. 17–19 at 3110 and is similar to the horizontal piping repair shown in FIGS. 12 and 13 with the exception of clamps 3112 and 3114 being secured to the piping on opposite sides of a flow-dividing T-box and blocks 3288 and 3290 of preloading mechanism 3118 being mounted at horizontally opposed ends of a pair of elongate arms 3312 and 3314 of bar-like configuration extending inwardly or towards one another from jaws 3122 of clamps 3112 and 3114, respectively. Referring also to FIGS. 20–23; it can be seen that arm 3314 carries a C-shaped bracket 3316 having vertically opposed flanges 3318 and 3320 with arcuate inner surfaces 3322 and 3324 configured to engage the outer cylindrical surface of the T-box 58 and a web 3326 configured to abut an inner face of the T-box as best seen, for example, in FIG. 22. Arm 3314 extends from an inner surface of the channel-like jaw 3122 of clamp 3114 to block 3288 of the preloading mechanism, with an elongate channel or passage 3292 being formed horizontally through the block and a slotted opening 3294 being formed vertically through the top surface of the block in communication with the elongate channel. An elongate extension or bar 3300 extends perpendicularly from between a pair of vertically spaced, generally rectangular recesses 3301 and 3302 in block 3288 at the end of arm 3312 and includes an opening 3304 with a beveled edge 3305, the elongate extension being configured to slide within the elongate channel such that openings 3294 and 3304 can be partially overlapped or aligned to receive a wedge 3306 as described above. As best seen in FIG. 18, piping 60 extends circumferentially around the reactor vessel 12, and clamps 3112 and 3114 extend around the piping at angularly spaced locations on opposite sides of the T-box 58 and are thus tilted away from one another and arms 3312 and 3314 when viewed from above. Nevertheless, when preloading mechanism 3118 is tightened, an axially compressive force is applied across a relatively short chord, that is, a linear path between angularly spaced portions of the piping, such that the force or preload is applied substantially along the longitudinal axis of the piping to urge opposed surfaces of any circumferential cracks together.

Cracks sometimes occur in the welds or weldments joining the T-box 58 with a thermal sleeve 3330 extending through the core spray nozzle 3332 of the reactor vessel 12 as shown, for example, in FIG. 25. In accordance with the present invention, therefore, a backing bar 3334 can be installed inside the vessel 12, as illustrated in FIGS. 24–26, to exert an axially compressive force or preload on the thermal sleeve piping 3330 to close the cracks. Backing bar 3334 includes a pair of feet 3336 and 3338 abutting arms 3312 and 3314 on opposite sides of the preload mechanism 3118 of repair apparatus 3110 and a pair of legs 3340 and 3342 extending upwardly from the feet at an angle toward an inner surface 3344 of the reactor vessel 12. Legs 3340 and 3342 bend upwardly at bends 3346 and 3348 adjacent feedwater sparger mounting brackets 3350 and 3352 and extend parallel with inner surface 3344 of the reactor vessel 12 to connect with outwardly extending arms 3354 and 3356 of the backing bar. Arms 3354 and 3356 extend outwardly from legs 3340 and 3342 to pivot on studs or lugs 3358 and 3360 extending inwardly from the reactor vessel to support the feedwater sparger mounting brackets 3350 and 3352, respectively. Arms 3354 and 3356 terminate in a pair of downwardly extending fingers 3362 and 3364 disposed on opposite sides of the studs 3358 and 3360 to locate the backing bar between the feedwater sparger mounting brackets 3350 and 3352. Outer peripheral edges of backing bar 3334 extend upwardly and inwardly toward one another from arms 3354 and 3356 to define a generally trapezoidal upper end 3366. A pivoting mechanism 3367 for pivoting the upper end of the backing bar away from the reactor vessel includes a block 3369 mounted at the upper end of the backing bar and defining an elongate channel or passage 3368 of generally rectangular configuration extending horizontally through the upper end of the backing bar in communication with a generally trapezoidal opening or recess 3370 extending vertically downward from a top face 3372 of the block. An elongate extension or bar 3374 with a slotted opening 3376 is slidingly received within channel 3368 and includes a radially outward facing surface 3378 which abuts inner surface 3344 of reactor vessel 12. A wedge 3380 is slidably disposed within aligned portions of openings 3370 and 3376 with a tightening bolt 3382 extending vertically through the wedge to be threadedly received within an opening 3384 formed through the upper end of the backing bar.

Backing bar 3334 is preferably installed after clamps 3112 and 3114 with tightening bolt 3382 in a loosely threaded condition or state. The backing bar is preferably lowered into the reactor vessel using long-handled tools and is manipulated to position legs 3340 and 3342 between feedwater sparger mounting brackets 3350 and 3352 such that arms 3354 and 3356 rest on studs 3358 and 3360 and feet 3336 and 3338 overlie arms 3310 and 3312 of the repair apparatus 3110. Tightening bolt 3382 is then tightened to cause wedge 3380 to move vertically downward within openings 3376 and 3370 such that an angled or beveled edge of the wedge will force sliding bar 3374 to move outwardly into contact with inner surface 3344 of the reactor vessel thereby rotating upper end 3366 of the backing bar away from the reactor vessel about the pivot established at studs 3358 and 3360. Pivotal movement of the upper end of the backing bar away from reactor vessel 12 causes feet 3336 and 3338 at the lower end of the backing bar to pivot outwardly, towards the reactor vessel, and into contact with arms 3312 and 3314 to exert an axially compressive force or preload on thermal sleeve 3330 via the flow divider 58 to close any cracks in the weldment connecting the thermal sleeve with the flow divider.

A modification of the piping repair according to the present invention for repairing cracks in welds joining an upper elbow 62 of the core spray supply piping with horizontal and vertical sections 60 and 64 of the piping, as illustrated in FIGS. 27–29 at 4110, includes clamps 4112 and 4114 secured to the horizontal and vertical sections of core spray supply piping 56, respectively, on opposite sides of elbow 62, a vertical preloading mechanism 4118' in the form of a tie-bolt connected between the clamps in tension to exert an axially compressive force or preload in a vertical direction along the vertical section of piping and a horizontal preloading device 4118 connected between the clamps to exert an axially compressive force or preload along the horizontal section of piping. Bias members (such as springs 5444 shown in FIG. 36) can be mounted in compression under the heads of the tie-bolt 4118' and the bolt 4308 extending through wedge 4306 to assist in maintaining a preload during thermal transients and the like. Clamp 4112 is similar to clamp 2112 and, as best seen in FIGS. 33–35, the clamp includes a channel section of generally C-shaped configuration defining a lower jaw 4122 with an inner surface 4126 extending circumferentially around the horizontal section of piping, and an upper jaw 4120 configured to slide within a slot 4286 formed in the channel and including an arcuate inner surface 4124 and a lip or ridge 4142 received within a groove or recess 4174 formed in the web of the channel-like lower jaw. A lug pin 4220 extends vertically downward through the upper jaw 4120 and is received within a hole 4222 formed vertically through the piping, for example using EDM techniques in the manner described above. A clamping bolt 4216 extends vertically through the jaws to secure the clamp to the piping.

The horizontal preloading mechanism 4118 is similar to the horizontal preloading mechanism 2118 shown in FIGS. 12 and 13 but with the elongate passage or channel 4292 being formed horizontally through a block 4290 carried by a curved structural support member 4228 of channel-like configuration and a slotted opening 4294 being formed vertically through the top surface of the block in communication with the elongate passage. Horizontal protrusions 4296 and 4298 project inwardly from above and below the horizontal passage 4292, respectively, to be received within a pair of vertically spaced, generally rectangular recesses 4301 and 4302 formed in block 4288 carried by jaw 4122 of clamp 4112. An elongate extension 4300 extends perpendicularly from between the rectangular recesses and includes an opening 4304 with a beveled peripheral edge 4305, the elongate extension being configured to slide within the elongate channel such that openings 4294 and 4304 can be partially overlapped or aligned to receive a wedge 4306 as described above. A tightening bolt 4308 extends downwardly through wedge 4306 in a vertical direction to be threadedly received in an opening 4310 formed through the bottom of block 4290. Support member 4228 includes a web 4260 and a flange 4256 with an arcuate inner surface 4390 which extends circumferentially around an upper portion of the horizontal piping 60 and elbow 62. A tie-bolt rib or boss 4192 of elongate, rectangular configuration extends vertically along support member 4228 and includes a tie-bolt hole 4198 formed vertically through the boss to accommodate tie-bolt 4118'.

Referring also to FIGS. 30–32, it can be seen that clamp 4114 is similar to clamp 1114 shown in FIG. 7 but with a tie-bolt rib or boss 4192' disposed alongside a vertical support member 4226 in alignment with boss 4192 carried by the horizontally extending support member 4228. Vertical support member 4226 extends upwardly from jaws 4120' and 4122' and includes a pair of spaced, parallel flanges 4248 and 4250 extending perpendicularly from a web 4252 to be disposed on opposite sides of the vertical section of piping. Boss 4192' extends upwardly from jaw 4120' of the clamp and, as best seen in FIG. 27, a lower end of the boss terminates above a rectangular lug pin guide boss 4236' with a clearance to permit tools to be coupled with the guide boss if desired. Lug pin 4220' protrudes radially inward from arcuate surface 4124' of jaw 4120' into an opening or hole 4222' formed horizontally through the vertical section 64 of piping.

The repair apparatus 4110 is preferably lowered into the reactor vessel in the assembled state or condition shown in FIGS. 27–29 with jaws of the clamps 4112 and 4114 facing in the same direction, toward the piping, to permit the apparatus to be positioned against the piping with relatively simple, transverse movements of a long-handled tool. Once positioned against the piping, clamping bolts 4216 can be tightened to secure clamps 4112 and 4114 to horizontal and vertical piping sections 60 and 64, respectively, on opposite sides of piping elbow 62. An axially compressive, horizontal preload can be applied to the piping to urge opposed surfaces of any circumferential cracks in the welds joining the horizontal piping section with the elbow by tightening bolt 4308 of the horizontal preloading mechanism. An axially compressive, vertical preload can also be applied to the piping to urge opposed surfaces of any circumferential cracks in the welds joining the vertical piping section with the elbow by tightening tie-bolt 4118'. If necessary or desired, bosses 4236 and 4236' can be used to pin the clamps relative to the piping. Referring to FIG. 28, it will be appreciated that all of the clamping and preloading functions of the apparatus 4110 can be accomplished using long-handled tools and vertical operations since each of the bolt heads faces vertically upward from a location laterally spaced from the other bolt heads.

As mentioned above, vertical sections 64 of the core spray supply piping typically extend downwardly from upper elbows 62 to lower elbows 66 where the piping turns inwardly, toward core shroud 18, to penetrate through the core shroud and connect with core spray spargers 54. As best seen in FIG. 46, a cylindrical safe end 5391 is welded to the exterior surface of the shroud at the point of penetration, and a horizontal piping section 5393 of smaller diameter than the safe end extends from a lower end of elbow 66 through the cylindrical safe end to connect with a flow divider or T-box 5395 inside the shroud communicating with the core spray spargers 54. Piping section 5393 and safe end 5391 are welded together at an annular abutment location 5397 which, if extensively cracked, may allow movement of the horizontal piping section relative to the lower elbow such that cracks 116 extending circumferentially along the welds joining the horizontal piping and the elbow will tend to open thereby allowing significant leakage of core spray coolant outside the core shroud. FIGS. 36–46 illustrate a modification of the repair apparatus according to the present invention for repairing cracks in the welds joining vertical sections 64 with lower elbows 66 and cracks in the welds joining elbows 66 with horizontal piping sections 5393 near the point of penetration of the core spray supply piping through the core shroud 18. The modified repair apparatus 5110 includes a pair of clamps 5112 and 5114 secured to a vertical section 64 of the piping at vertically spaced locations above lower elbow 66 and a third clamp 5400 extending circumferentially around a lower end of elbow 66 and horizontal piping section 5393 at or near the point of core shroud penetration.

As best seen in FIGS. 45 and 46, clamp 5400 includes a pair of jaws 5404 and 5406 defining a pair of opposed arcuate surfaces 5408 and 5410 which extend circumferentially around the lower elbow weld in vertically opposed relation from a pair of mating body portions 5412 and 5414. A clamping bolt 5416 extends vertically through clamp body portions 5412 and 5414 to tighten the jaws 5404 and 5406 about a fulcrum 5418 defined by inwardly raised edges of the clamp bodies. An elongate pin 5420 extends vertically through jaws 5404 and 5406 between clamping bolt 5416 and arcuate surfaces 5408 and 5410 to maintain alignment of the jaws.

Clamp 5400 defines a cylindrical recess 5421 on the shroud side for receiving safe end 5391 and a groove 5423 on the side adjacent the elbow for receiving a metal O-ring 5425. When clamping bolt 5416 is tightened, O-ring 5425 engages the lower end of the elbow to form a circumferential seal on one side of the crack 116 while safe end 5391 is snugly held within recess 5421 to form a circumferential seal on the other side of the crack. Because of the limited space between the lower elbow and the shroud, it would be difficult to secure separate clamps on opposite sides of a crack occuring between the elbow and the shroud such that an axially compressive preload cannot be applied along a longitudinal axis of the piping to close the crack. However, by covering cracked portions of the piping with a clamp providing a limited leakage seal between the lower end of the elbow and the shroud, leakage of core spray coolant due to displacement of the core spray sparger 54 in a direction away from the elbow can be controlled. A seal clamp in accordance with the foregoing can be used at any location where it is not practical to provide sufficient axially compressive preload on the piping to prevent excessive leakage due to crack opening. While the seal clamp 5400 is shown with a cylindrical recess at one end for receiving a safe end and an O-ring at an opposite end for engaging curved piping, it will be appreciated that any type of suitable seal can be formed at either end depending upon the configuration of the piping being repaired.

Referring again to FIG. 36, curved support member or channel section 5422 extends between clamp 5114 and clamp 5400 and, as best seen in FIG. 40, the curved channel section includes a pair of curved flanges 5427 and 5429 disposed along inner and outer radii of the elbow 66, respectively, and a web 5431 extending transversely between the flanges along one side of the elbow. Web 5431 extends laterally beyond flange 5427 to define a key 5433 received within a vertical keyway 5435 formed in clamp 5400 to prevent lateral motion, tangent to the shroud, of the channel extension 5422 relative to clamp bodies 5404 and 5406 of clamp 5400. Flange 5429 of the curved channel section carries a bracket 5424 with a pin 5426. A spring 5428 formed of a resilient strip of material such as, for example, Inconel X-750, is mounted between bracket 5424 and inner surface 5344 of reactor vessel 12 in compression to exert an axial force on clamp 5400 in the direction of shroud 18, the spring including a flange or foot 5430 pinned within the bracket 5424 and a flange or foot 5432 abutting inner surface 5344 of the reactor vessel. Feet 5430 and 5432 of the spring are connected by a pair of legs 5434 and 5436 extending downwardly from the feet at an angle to a bend 5438 where the legs connect to form a generally V-shaped member. It will be appreciated, however, that other types of bias members and springs can be used including, but not limited to, coil springs, pan springs, leaf springs, and Belleville springs.

Clamps 5112 and 5114 are similar to clamps 1112 and 1114 but are disposed on opposite sides of a telescoping joint 5402 connecting a vertical section of elbow 66 with the vertical piping section or downcomer 64. Vertical support members or channel sections 5224 and 5226 extend upwardly from clamps 5112 and 5114, respectively, to stabilize the vertical piping section. In addition, support member or channel section 5226 includes outwardly protruding ears 5440 aligned with ears 5442 protruding outwardly of a support member or channel section 5228 extending downwardly from clamp 5112. Vertical tie-bolts 5118 extend through the ears, and stacked Belleville springs 5444 are disposed around the tie-bolts and held in compression between ears 5442 and a cross-bar 5446 of generally C-shaped configuration when viewed from above to provide elastic compliance to accommodate differential thermal effects on the piping while maintaining a preload on the piping. Channel sections 5226 and 5228 are also provided with lug pin bosses 5236 similar to any of the lug pin bosses described above and including threaded bores 5238 oriented toward the piping.

In use, the repair apparatus 5110 is preferably assembled prior to being lowered into the reactor vessel, with flange 5430 of spring 5428 being pinned within bracket 5424 and the spring being held in a compressed state or condition using any suitable tooling. With spring 5428 maintained in the compressed condition, apparatus 5110 is lowered into the reactor vessel 12 and positioned around the lower elbow 66 as shown in FIG. 36. Clamps 5112 and 5114 are secured to the vertical piping section 64 in the manner described above and are urged toward one another by tightening tie-bolts 5118 against the bias of Belleville springs 5444. Clamp 5400 is secured to the lower end of elbow 66 by tightening bolt 5416, after which spring 5428 may be released to allow flange 5432 of the spring to bear against inner surface 5344 of the reactor vessel so as to apply an axially compressive preload on the core spray supply piping penetrating the core shroud. During installation or after one or more operating cycles of the reactor, lug pin bosses 5236 can be used as guides to form holes in the piping and to hold lug pins within the holes in the event excessive cracking of the piping is detected.

Referring to FIG. 36, it will be appreciated that clamp 5112 transmits axial load to the piping via a shoulder formed by the coupling and the topmost fillet weld. As long as the fillet weld is intact, it is not necessary to form a hole in the piping for purposes of pinning the clamp to the pipe via the boss 5236 because the fillet weld and coupling can accommodate the clamp preload in an axial direction parallel to the longitudinal axis of the piping. After suitable inspection of the fillet weld to confirm adequacy, this feature allows clamp installation and reactor operation without the need for EDM operations during installation.

From the above, it will be appreciated that the repair method and apparatus according to the present invention permits continued use of cracked core spray supply piping and the like in a boiling water reactor, where by "core spray supply piping" is meant in-vessel piping components of the core spray supply system including, but not limited to, the core spray spargers within the core shroud and the piping connecting the core spray spargers with nozzles in the reactor vessel. The repair can be performed in situ during scheduled outages, when the reactor is normally shut down, and can accommodate any degree of circumferential cracking of the core spray supply piping for at least the next one or two operating cycles of the reactor. In addition, the repair minimizes reactor down time and reduces exposure of personnel to potentially hazardous levels of radiation within the reactor vessel by permitting complete installation from outside the vessel using primarily vertical operations performed with long-handled tools and remote cameras.

The repair described herein involves securing clamps to the piping on opposite sides of the crack and urging the clamps towards one another to apply and maintain an axially compressive force or preload on the piping to urge opposed surfaces of the crack together. Fit-up tolerances such as, for example, differences in diameter and out-of-roundness, are taken up automatically as the clamping and preload assemblies are tightened. The axially compressive force or preload also compensates for differential thermal contraction of the piping caused when cold core spray injection water is introduced into the system, thereby preventing significant crack opening widths and limiting leakage of the core spray injection water to acceptable levels. The repair is adequate for all design basis loads including, for example, dead weight, seismic inertia, seismic and thermal anchor displacements, fluid drag, core spray injection, internal pressure and flow loads. As a result, design basis core spray delivery flow can be assured without the need of having to make licensing basis changes.

The clamps preferably include a pair of jaws with arcuate inner surfaces that extend circumferentially around the piping in opposed relation from mating clamp bodies, where by "circumferentially" is meant around all or part of the circumference of the piping. Inner surfaces of the jaws need not be arcuate, however, and can have any configuration for being securely clamped to the piping. Moreover, the clamp bodies can have any configuration to mount the jaws and mate with one another in movably opposed relation. For example, while pads are shown which contact one another to define a fulcrum about which the clamps pivot to engage the piping, it will be appreciated that the mating clamp bodies can be pinned to define a fulcrum or configured to operate linearly and/or radially without a fulcrum. When a wedge is used to tighten the clamping and/or preload assemblies, the wedge can have more than one angled cam surface if desired, with any of the cam surfaces being flat and planar as shown, curved or provided with compound angles and/or curves.

For extensive cracking, lugs or lug pins can be carried on one or both jaws of each clamp in opposed relation to holes formed in the core spray piping. The holes can be formed prior to or after installation of the clamps, for example using electron discharge machining, or EDM, techniques to perform a plunge cut of two axially spaced, circular holes. The lugs can extend inwardly, toward the piping, from any portion of the jaws including, but not limited to, arcuate and mating body portions thereof. The lugs are configured to fit within the holes with suitable clearance for machine tolerances and ease of installation without infringing upon the inner diameter of the core spray piping and are suitably sized to carry the full axial design basis loads without reliance on friction, even in the event of a through-wall crack extending 360° around the circumference of the piping. Since the lugs do not protrude beyond the inner diameter of the piping, there is no obstruction to the flow of core spray coolant through the piping, and the repair does not reduce core spray flow or change the spray pattern significantly.

For cracking which is not extensive or which occurs in the core spray piping within the core shroud, it is acceptable to rely on a combination of non-cracked ligaments and other existing structural features of the piping (such as, e.g., the spray nozzles or welded couplings) to transmit axial loads such that holes need not be formed in the piping and the clamps can be installed without lugs. In such cases, however, it is advantageous to provide pre-drilled guides on the clamps so that, in the event of further cracking, the clamps can be retrofitted to include lugs that extend into holes formed in the piping. Preferably, such a retrofit can be accomplished without removing the clamps, for example by using the guides as a jig when forming the holes and then mounting the lugs within the guides to extend into the holes.

The repair is preferably installed at the first scheduled outage following detection of cracking in the core spray supply piping; however, there may be circumstances where repairs are undertaken before any cracks have been detected or during outages scheduled specifically to allow for installation of the repair. The clamps are preferably lowered into the reactor vessel as a unit but can be lowered individually and secured separately to the piping if necessary or desired. Tightening bolts for the clamping and preload assemblies are preferably positioned with their heads facing upwardly, in the vertical direction, to facilitate one-sided access using long-handled tools thereby minimizing or eliminating the need for right angled drives and custom tooling. When the clamps are axially spaced along a vertical section of piping in the reactor vessel, the tightening bolts for the respective clamping assemblies may be vertically aligned with one another such that tightening the lower clamp requires the use of tools having laterally offset drivers; or, alternatively, the clamps can be radially spaced from one another or configured such that the tightening bolts are offset to allow both clamps to be tightened with a straight driver.

The bolts for the clamping and preload assemblies are preferably locked in place after being tightened, for example using crimp locks or any other suitable bolt locking device or technique. Bias members, such as springs, can be held in compression between the bolts and one or more of the bolted components to maintain the bolts in tension during thermal transients such as would occur, for example, when cold core spray water is pumped through hot core spray supply piping in response to a LOCA.

Any suitable materials can be used for the repair so long as they provide resistance to stress and crevice corrosion; however, Series 300 (Type 304 or 316) stainless steel is preferably used for the clamp bodies in the fully solution annealed and rapid quenched condition or with yield strength limited to about 52,000 k.s.i. (max). Type XM-19 materials are preferred for the pins when in the annealed condition, and Inconel X-750 is preferred for any backing bars or springs that may be used with the clamps as part of the repair. The depth of cold work for the stainless steel parts is preferably limited to about 0.003 inches, with cold work on threaded portions of the components preferably being minimized. In addition, threaded joints are preferably lightly loaded under normal operation and can be vented to prevent adverse crevice conditions.

When the clamps are provided with lugs or pins, the lugs can be mechanically coupled with the clamps, for example by welding or threaded engagement, or can be integrally formed with the clamp bodies as an integral, one-piece unit. The clamps can be provided with structural support members or extensions to assist in installation by providing suitable spacing between the clamps or alignment of the preload mechanism. One or both clamp bodies of each clamp can carry structural support members or extensions.

The procedural steps of the foregoing core spray supply piping repair can be performed in any order dependent upon reactor design and the configuration of the clamp assemblies.

Inasmuch as the present invention is subject to many variations, modifications and changes in detail, it is intended that all subject matter discussed above or shown in the accompanying drawings be interpreted as illustrative only and not be taken in a limiting sense.

What is claimed is:

1. A method of repairing cracked core spray supply piping in a boiling water reactor vessel comprising the steps of
    mounting a backing bar with first and second ends for pivotal movement about a fulcrum attached to an inner surface of the reactor vessel;
    positioning the first end of the backing bar adjacent a flow divider connecting circumferential arms of the core spray supply piping with a thermal sleeve extending through a nozzle in the reactor vessel;
    positioning the second end of the backing bar adjacent the inner surface of the reactor vessel; and
    pivoting the second end of the backing bar away from the inner surface of the reactor vessel to cause the first end of the backing bar to pivot towards the inner surface of the reactor vessel and into contact with the flow divider in order to apply an axially compressive force to close any cracks in the weldments joining the flow divider with the thermal sleeve.

2. A method of repairing cracked core spray supply piping as recited in claim 1 wherein said mounting step includes suspending the backing bar between feedwater sparger mounting brackets.

3. A method of repairing cracked core spray supply piping in a boiling water reactor vessel comprising the steps of
    lowering a pair of clamps into the reactor vessel;
    securing the clamps to the piping on opposite sides of a crack with at least one of the clamps carrying a boss with a bore formed therethrough in the direction of the piping;
    using the boss to form a hole through the piping in alignment with the bore;
    inserting a plug through the bore and into the hole in the piping; and
    urging the clamps together to apply an axially compressive force on the piping via the plug to close the crack and prevent leakage from the core spray supply piping.

4. A method of repairing cracked core spray supply piping in a boiling water reactor vessel comprising the steps of
    lowering a pair of clamps into the reactor vessel;
    securing the clamps to the piping on opposite sides of a crack, at least one of the clamps having horizontally opposed jaws secured to a vertical section of the piping by driving a wedge vertically through aligned openings formed in relatively movable, mating portions of the opposed jaws; and
    urging the clamps together to exert an axially compressive force on the piping to close the crack and prevent leakage of coolant from the core spray supply piping.

5. A method of repairing cracked core spray supply piping as recited in claim 4 wherein the crack occurs along a vertical section of the piping and said securing step includes positioning jaws of each clamp around the piping in horizontally opposed relation and driving a wedge vertically through aligned openings formed in relatively movable, mating portions of the horizontally opposed jaws to draw the jaws together around the piping.

6. A method of repairing cracked core spray supply piping as recited in claim 5 wherein said step of urging the clamps together includes maintaining a bolt extending vertically through the clamps in tension.

7. A method of repairing cracked core spray supply piping as recited in claim 6 wherein said maintaining step includes positioning a spring in compression between the bolt and at least one of the clamps.

8. A method of repairing cracked core spray supply piping as recited in claim 4 wherein the crack occurs adjacent an elbow connecting horizontal and vertical sections of the piping and said securing step includes positioning jaws of a first of the clamps around the horizontal section of piping in vertically opposed relation and connecting a bolt between the jaws in tension to draw the jaws together around the horizontal section of piping, and positioning jaws of a second of the clamps around the vertical section of piping in horizontally opposed relation and driving a wedge vertically through aligned openings formed in relatively movable, mating portions of the horizontally opposed jaws to draw the jaws together around the vertical section of piping.

9. A method of repairing cracked core spray supply piping as recited in claim 8 wherein said step of urging said clamps together includes driving a wedge vertically through aligned openings formed in relatively movable, mating portions of the clamps to bias the clamps toward one another in the horizontal direction.

10. A method of repairing cracked core spray supply piping as recited in claim 8 wherein said step of urging said clamps together includes maintaining a bolt extending vertically through the clamps in tension to bias the clamps toward one another in the vertical direction.

11. A method of repairing cracked core spray supply piping in a boiling water reactor vessel comprising the steps of
    lowering a clamp into the reactor vessel;
    securing the clamp to a horizontal section of the piping adjacent a crack where the piping penetrates through a core shroud disposed within the reactor vessel to connect with core spray spargers within the shroud; and
    positioning a bias member between the clamp and the reactor vessel in compression to apply an axially compressive load on the horizontal section of piping in the direction of the shroud.

12. A method of repairing cracked core spray supply piping in a boiling water reactor vessel comprising the steps of
    lowering a pair of clamps carrying relatively movable, mating portions into the reactor vessel;
    securing the clamps to a horizontal section of the piping on opposite sides of a crack;
    partially aligning openings formed through the mating portions of the clamps; and
    driving a wedge vertically through the partially aligned openings to bias the clamps toward one another in the horizontal direction thereby applying an axially compressive force on the piping to close the crack and prevent leakage of core spray coolant from the core spray supply piping.

13. A method of repairing cracked core spray supply piping as recited in claim 12 wherein the horizontal section of the piping includes a pair of arms extending circumferentially around the reactor vessel from a flow divider and said step of securing the clamps includes securing the clamps to the arms on opposite sides of the flow divider.

14. A method of repairing cracked core spray supply piping as recited in claim 13 wherein the flow divider connects the circumferential arms of the core spray supply piping with a thermal sleeve extending through a nozzle in the reactor vessel and further comprising the step of applying a radially outwardly directed force on the flow divider to close any cracks in the weldments joining the flow divider with the thermal sleeve.

\* \* \* \* \*